(12) United States Patent
Brusatore et al.

(10) Patent No.: US 10,842,084 B2
(45) Date of Patent: Nov. 24, 2020

(54) VERTICAL GROWING TOWER FOR AUTOMATED HORTICULTURE AND AGRICULTURE

(71) Applicant: AFFINOR GROWERS INC., Vancouver (CA)

(72) Inventors: Nicholas G. Brusatore, Abbotsford (CA); Ron Adolf, Coquitlam (CA); Ron G. Fraser, Port Coquitlam (CA); Ryan Ronald Adolf, Coquitlam (CA)

(73) Assignee: Affinor Growers Inc., Vancouver (CA)

(*) Notice: Subject to any disclaimer, the term of this patent is extended or adjusted under 35 U.S.C. 154(b) by 0 days.

(21) Appl. No.: 16/106,733

(22) Filed: Aug. 21, 2018

(65) Prior Publication Data
US 2018/0352754 A1    Dec. 13, 2018

Related U.S. Application Data

(63) Continuation-in-part of application No. 15/120,011, filed as application No. PCT/CA2015/050127 on Feb. 19, 2015, now Pat. No. 10,070,594.
(Continued)

(51) Int. Cl.
*A01G 9/02* (2018.01)
*A01G 9/20* (2006.01)
(Continued)

(52) U.S. Cl.
CPC .............. *A01G 9/023* (2013.01); *A01G 9/028* (2013.01); *A01G 9/20* (2013.01); *A01G 9/247* (2013.01);
(Continued)

(58) Field of Classification Search
CPC . A01G 7/02; A01G 7/045; A01G 9/12; A01G 9/20; A01G 9/023; A01G 31/02;
(Continued)

(56) References Cited

U.S. PATENT DOCUMENTS

| 1,500,917 A | 7/1924 | Bell |
| 2,152,869 A | 4/1939 | Campbell |

(Continued)

FOREIGN PATENT DOCUMENTS

| CA | 2343254 | 7/2001 |
| CA | 2396317 | 11/2002 |

(Continued)

OTHER PUBLICATIONS

PCT International Search Report and the Written Opinion in International Application No. PCT/CA2015/050127 dated May 7, 2015.
(Continued)

*Primary Examiner* — Richard G Davis
(74) *Attorney, Agent, or Firm* — Oyen Wiggs Green & Mutala LLP

(57) ABSTRACT

A method and apparatus for continuous automated growing of plants utilizes a vertical array of plant supporting arms extending radially from a central column. Each arm has a plurality of plant receiving trough elements which receive the plant seedling and liquid nutrients and water. The plant supporting arms rotate on the hollow column which is motor-driven at its lower end and supported on a bearing mounted on a fixed central pipe at its upper end. The central pipe is fixed to a concrete base or post buried in the supporting surface.

13 Claims, 24 Drawing Sheets

Related U.S. Application Data

(60) Provisional application No. 61/942,500, filed on Feb. 20, 2014.

(51) Int. Cl.
| | | |
|---|---|---|
| *A01G 9/24* | (2006.01) | |
| *A01G 31/06* | (2006.01) | |
| *A01G 31/04* | (2006.01) | |
| A01G 7/04 | (2006.01) | |
| A01G 9/26 | (2006.01) | |

(52) U.S. Cl.
CPC ............. *A01G 31/04* (2013.01); *A01G 31/06* (2013.01); *A01G 7/045* (2013.01); *A01G 9/26* (2013.01); *A01G 31/047* (2013.01)

(58) Field of Classification Search
CPC ...... A01G 31/04; A01G 31/047; A01G 31/06; Y02P 60/216; Y02P 60/146
See application file for complete search history.

(56) References Cited

U.S. PATENT DOCUMENTS

| | | | |
|---|---|---|---|
| 3,254,447 A | 6/1966 | Ruthner | |
| 3,339,308 A | 9/1967 | Clare | |
| 3,529,379 A | 9/1970 | Ware | |
| 3,667,157 A | 6/1972 | Longhini | |
| 3,747,268 A | 7/1973 | Linder | |
| 3,772,827 A | 11/1973 | Ware | |
| 3,824,736 A | 7/1974 | Davis | |
| 3,882,634 A | 5/1975 | Dedolph | |
| 3,909,978 A | 10/1975 | Fleming | |
| 3,973,353 A | 8/1976 | Dedolph | |
| D247,165 S | 2/1978 | Hart | |
| 4,085,544 A | 4/1978 | Blake | |
| 4,250,666 A * | 2/1981 | Rakestraw | ............ A01G 7/045 211/131.1 |
| 4,255,897 A | 3/1981 | Ruthner | |
| 4,258,501 A * | 3/1981 | Brown | ................. A01G 31/047 47/16 |
| 4,356,664 A | 11/1982 | Ruthner | |
| 4,513,531 A | 4/1985 | Lestraden | |
| 4,622,777 A | 11/1986 | Greene, Jr. | |
| 5,165,364 A | 11/1992 | Horkey | |
| 5,276,997 A | 1/1994 | Swearengin | |
| 5,372,474 A | 12/1994 | Miller | |
| 5,515,648 A | 5/1996 | Sparkes | |
| 5,584,141 A | 12/1996 | Johnson | |
| 5,617,673 A | 4/1997 | Takashima | |
| 5,862,628 A | 1/1999 | Takashima | |
| 5,918,416 A | 7/1999 | Ammann, Jr. | |
| D429,661 S | 8/2000 | Yano | |
| 6,378,246 B1 | 4/2002 | DeFoor | |
| 6,394,030 B1 | 5/2002 | Geiger et al. | |
| 6,557,491 B1 | 5/2003 | Weiser et al. | |
| 6,604,321 B2 | 8/2003 | Marchildon | |
| 6,615,542 B2 | 9/2003 | Ware | |
| 6,840,007 B2 | 1/2005 | Leduc et al. | |
| D511,995 S | 11/2005 | Pettis, III | |
| 7,055,282 B2 | 6/2006 | Bryan, III | |
| 7,143,544 B2 | 12/2006 | Roy | |
| 7,168,206 B2 | 1/2007 | Agius | |
| 7,181,886 B2 | 2/2007 | Bourgoin et al. | |
| 7,188,451 B2 | 3/2007 | Marchildon | |
| 7,401,437 B2 | 7/2008 | Dumont | |
| 7,415,796 B2 | 8/2008 | Brusatore | |
| 7,488,098 B2 | 2/2009 | Dumont | |
| 7,533,493 B2 | 5/2009 | Brusatore | |
| 7,559,173 B2 | 7/2009 | Brusatore | |
| 7,818,917 B2 | 10/2010 | Brusatore | |
| D631,683 S | 2/2011 | Ash et al. | |
| D638,743 S | 5/2011 | Bouchard et al. | |
| 7,984,586 B2 | 7/2011 | Brusatore | |
| 8,234,814 B2 | 8/2012 | Kurtz | |
| 8,418,403 B1 * | 4/2013 | Nuttman | ................ A01G 9/024 47/82 |
| 8,756,860 B1 | 6/2014 | Murphy | |
| 8,776,433 B2 | 7/2014 | Huang | |
| D714,993 S | 10/2014 | Clendening et al. | |
| 9,357,715 B2 | 6/2016 | Cottrell | |
| 9,374,952 B1 * | 6/2016 | Cross | ..................... A01G 31/02 |
| D760,622 S | 7/2016 | Ogden | |
| 9,591,814 B2 | 3/2017 | Collins et al. | |
| 9,622,427 B2 | 4/2017 | Wagner | |
| D809,965 S | 2/2018 | Linneberg | |
| 9,918,436 B2 | 3/2018 | Cudmore et al. | |
| 9,968,039 B2 | 5/2018 | Graber | |
| 10,004,186 B2 | 6/2018 | Daugirdas | |
| 10,070,594 B2 | 9/2018 | Brusatore | |
| 10,136,594 B2 | 11/2018 | Blank | |
| 10,206,344 B2 | 2/2019 | Bryan, III | |
| 10,264,735 B2 | 4/2019 | Cudmore | |
| D870,592 S | 12/2019 | Addison | |
| 10,499,575 B2 | 12/2019 | Stoltzfus et al. | |
| 10,575,478 B2 | 3/2020 | Stolzfus et al. | |
| 2002/0144461 A1 | 10/2002 | Marchildon | |
| 2004/0111965 A1 | 6/2004 | Agius | |
| 2004/0163308 A1 | 8/2004 | Uchiyama | |
| 2005/0011119 A1 | 1/2005 | Bourgoin et al. | |
| 2005/0039396 A1 | 2/2005 | Marchildon | |
| 2005/0039397 A1 | 2/2005 | Roy | |
| 2005/0055878 A1 | 3/2005 | Dumont | |
| 2005/0257424 A1 | 11/2005 | Bissonnette et al. | |
| 2006/0150481 A1 | 7/2006 | Hung et al. | |
| 2006/0196118 A1 | 9/2006 | Brusatore | |
| 2006/0230674 A1 | 10/2006 | Marchildon | |
| 2007/0141912 A1 | 6/2007 | Dumont | |
| 2007/0251145 A1 | 11/2007 | Brusatore | |
| 2007/0271842 A1 | 11/2007 | Bissonnette et al. | |
| 2008/0110088 A1 | 5/2008 | Brusatore | |
| 2008/0222949 A1 | 9/2008 | Bissonnette et al. | |
| 2010/0115837 A1 | 5/2010 | Van Der Poel et al. | |
| 2010/0146854 A1 * | 6/2010 | Cannon | ................... A01G 9/023 47/82 |
| 2010/0236147 A1 | 9/2010 | Brusatore | |
| 2011/0192082 A1 | 8/2011 | Uchiyama | |
| 2013/0145690 A1 * | 6/2013 | Cannon | ................... A01G 9/023 47/66.7 |
| 2013/0185997 A1 | 7/2013 | Trofe | |
| 2014/0000162 A1 | 1/2014 | Blank | |
| 2014/0196363 A1 * | 7/2014 | Chung | ................. A01G 31/047 47/1.7 |
| 2015/0223418 A1 * | 8/2015 | Collins | ................... A01G 31/02 47/62 R |
| 2015/0334930 A1 * | 11/2015 | Stoltzfus | ................ A01G 31/06 47/62 A |
| 2016/0037739 A1 | 2/2016 | Bishop | |
| 2016/0120141 A1 | 5/2016 | Stolzfus et al. | |
| 2017/0055473 A1 | 3/2017 | Baker | |
| 2017/0347533 A1 | 12/2017 | Volin | |
| 2018/0042186 A1 | 2/2018 | Kop | |
| 2018/0098516 A1 | 4/2018 | Buuren et al. | |
| 2018/0263201 A1 | 9/2018 | Linneberg | |

FOREIGN PATENT DOCUMENTS

| | | |
|---|---|---|
| CA | 2412073 | 5/2004 |
| CA | 2503705 | 6/2004 |
| CA | 2431523 | 12/2004 |
| CA | 2536116 | 2/2005 |
| CN | 1895027 | 1/2007 |
| CN | 101150951 A | 3/2008 |
| CN | 101647386 A | 2/2010 |
| CN | 202184024 U | 4/2012 |
| DE | 2639088 | 3/1978 |
| FR | 2240684 | 3/1975 |
| FR | 2345912 | 10/1977 |
| FR | 2680074 | 2/1993 |
| FR | 3057735 A | 4/2018 |
| GB | 2026831 | 2/1980 |
| GB | 2269304 | 2/1994 |
| GB | 2220551 A | 1/2012 |

(56) References Cited

FOREIGN PATENT DOCUMENTS

| | | |
|---|---:|---|
| GB | 2560013 A | 8/2018 |
| JP | H0220947 A | 12/1985 |
| JP | 4229111 | 8/1992 |
| JP | 2001128571 | 5/2001 |
| KR | 101275976 A | 8/2012 |
| NC | 20160004509 A | 11/2016 |
| RU | 2034448 | 5/1992 |
| SU | 650557 | 3/1979 |
| SU | 914004 | 3/1982 |
| SU | 1722301 | 3/1992 |
| WO | 2006096650 | 9/2006 |
| WO | 2008156538 | 12/2008 |
| WO | 2010029993 | 3/2010 |
| WO | 2010110844 | 9/2010 |
| WO | 2011067548 | 9/2011 |
| WO | 2015123776 A1 | 8/2015 |
| WO | 2016081711 A | 5/2016 |

OTHER PUBLICATIONS

International Search Report for PCT/CA2019/051145 completed Oct. 24, 2019.
U.S. Pat. No. 262,335 to G.A. Wagner dated Aug. 8, 1882.

\* cited by examiner

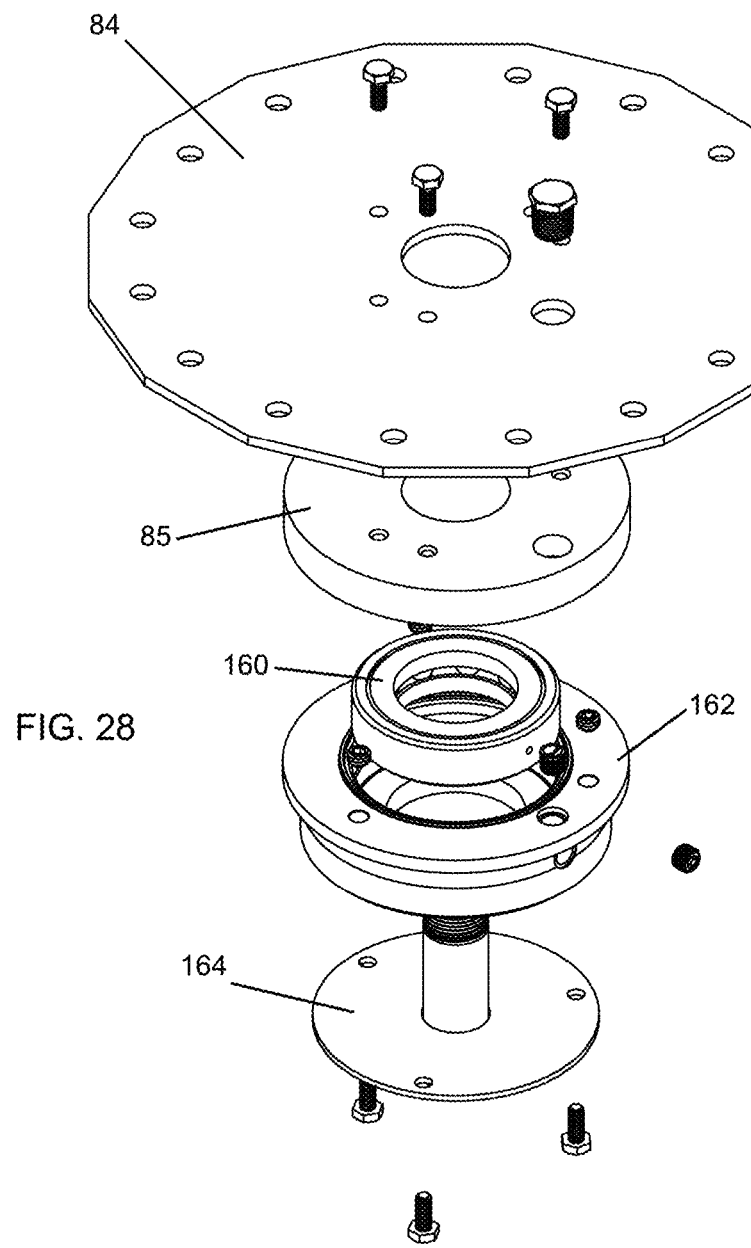

US 10,842,084 B2

VERTICAL GROWING TOWER FOR AUTOMATED HORTICULTURE AND AGRICULTURE

CROSS REFERENCE TO RELATED APPLICATION

The present application is a continuation-in-part of U.S. patent application Ser. No. 15/120,011 entitled "Method and Apparatus for Automated Vertical Horticulture and Agriculture" which is pending and claims the benefits, under 35 U.S.C. § 119(e), of U.S. Provisional Application Ser. No. 61/942,500 filed Feb. 20, 2014 entitled "Method and Apparatus for Automated Vertical Horticulture and Agriculture" and which is a 371 of international application no. PCT/CA2015/050127 filed Feb. 19, 2015 entitled "Method and Apparatus for Automated Vertical Horticulture and Agriculture", all of which are incorporated herein by this reference.

TECHNICAL FIELD

The invention relates to the fields of horticulture, hydroponics and agriculture and particularly apparatus and methods for automated commercial growth and production of plants in controlled environments.

BACKGROUND

Traditionally the commercial horticultural and agricultural growth of plants has been carried out in nurseries and greenhouses, where the plants are arranged horizontally and are stationary. More efficient methods have more recently been developed, some of which are referred to as 'vertical farming'. The present inventor, for example, in U.S. Pat. Nos. 7,415,796, 7,533,494, 7,559,173, 7,818,917 and 7,984,586 disclosed methods of growing plants using a rotating vertical carousel of rotating spheres, each having a central light source around which rows of plants are rotated, to thereby increase the productivity of plant growth in a given area. However harvesting of mature plants from such systems can be complicated and time consuming.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention provides a method and apparatus for continuous automated growing of plants. A vertical array of plant supporting arms extends radially from a central axis. Each arm has a plurality of pot receptacles which receive the plant seedling and liquid nutrients and water. The potting arms are rotated beneath grow lamps and pollinating arms. The frequency of feeding is increased as the plants grow. $CO^2$ enriched air may also be provided. Once the plants are ready to harvest, they are manually exchanged for new seedlings and packaged.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 28 is an exploded perspective view of a second embodiment of the bearing housing assembly.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
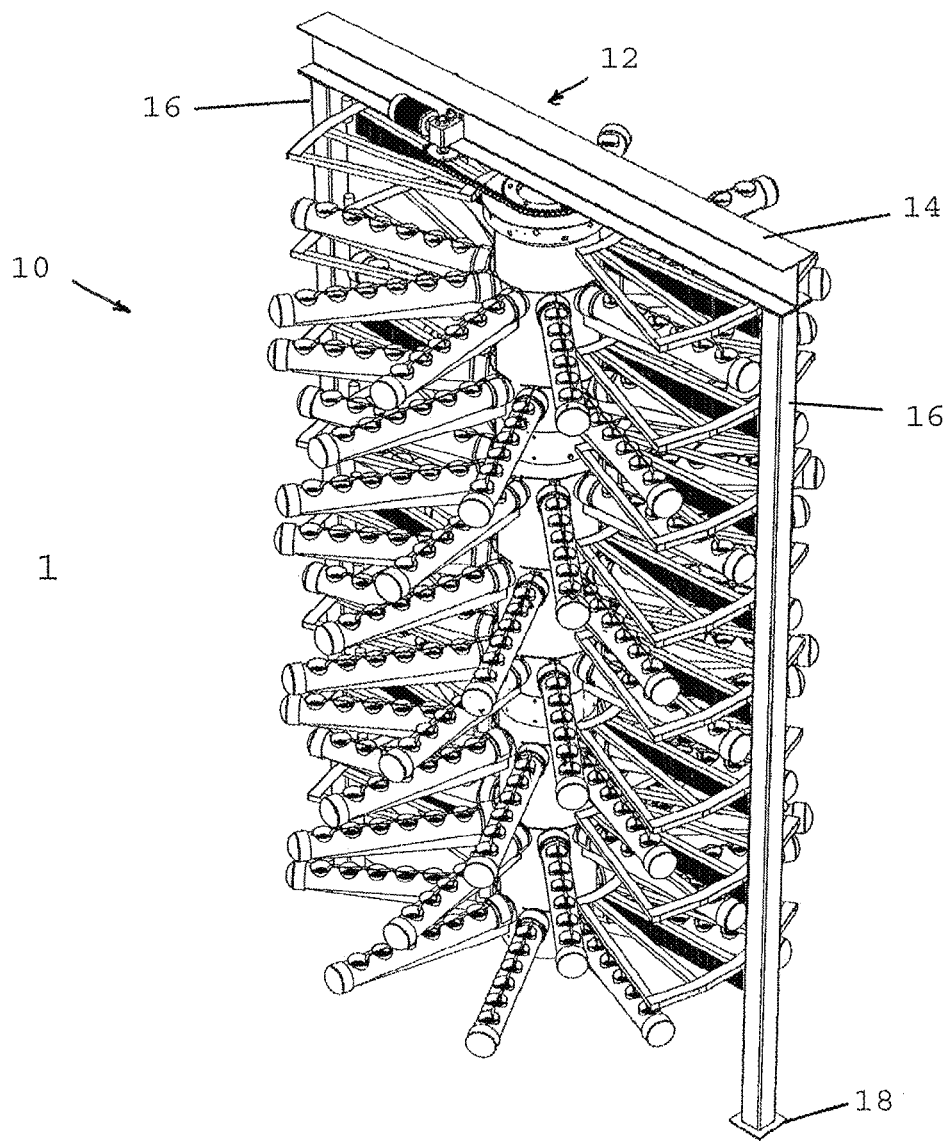
FIG. 1 is a perspective view of a growing unit for carrying out the method of the invention, with light bulbs removed for ease of illustration.

With reference to FIG. 1, a growing unit for automated vertical cultivation and harvesting of plants is designated generally as 10. It has a frame 12 including a horizontal beam 14 and vertical posts 16, the lower ends of which have flanges or feet 18 fixed to the floor of the growing facility.

Figure 3:
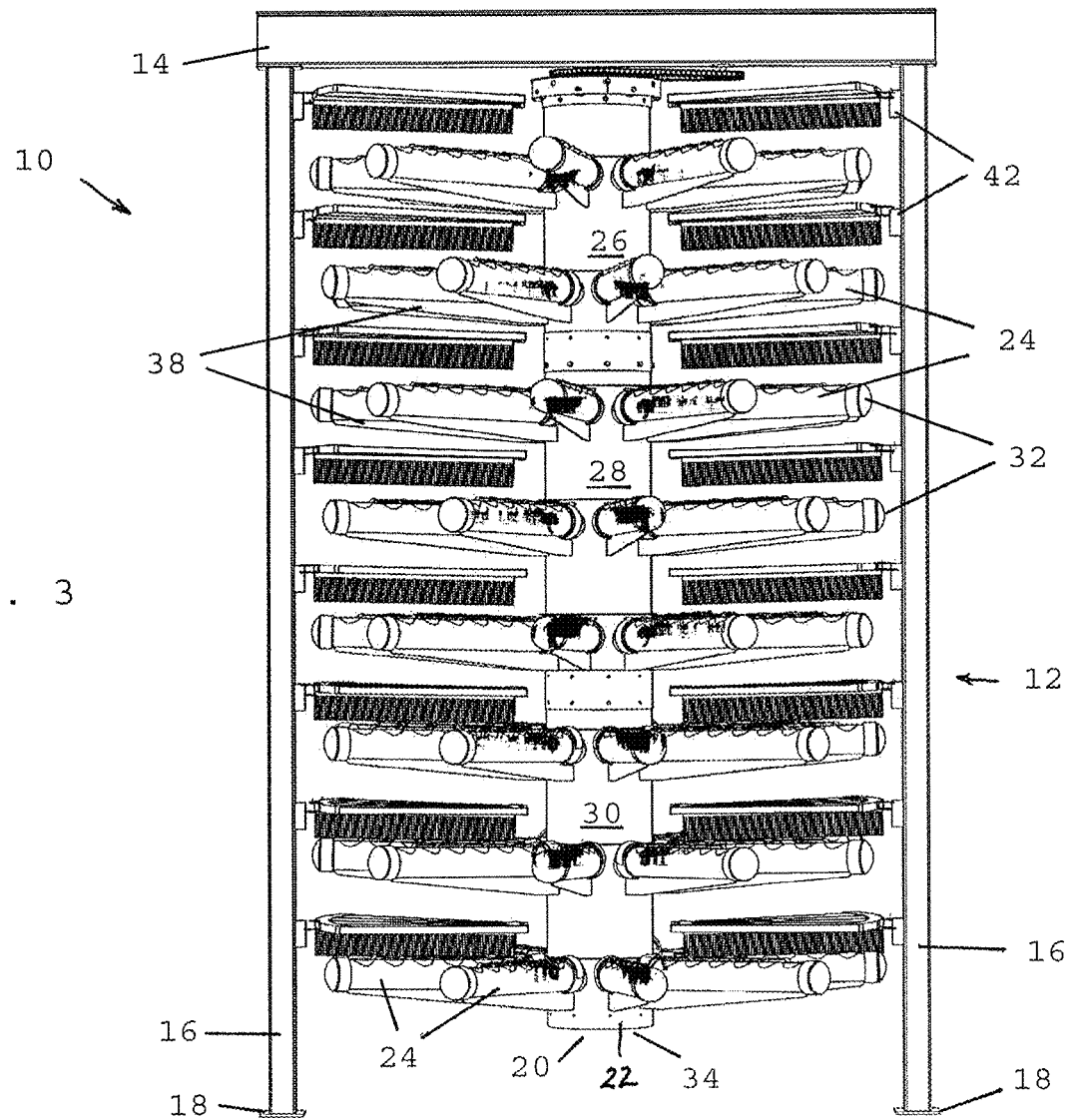
FIG. 3 is a front view of the growing unit shown in FIG. 1.
Figure 4:
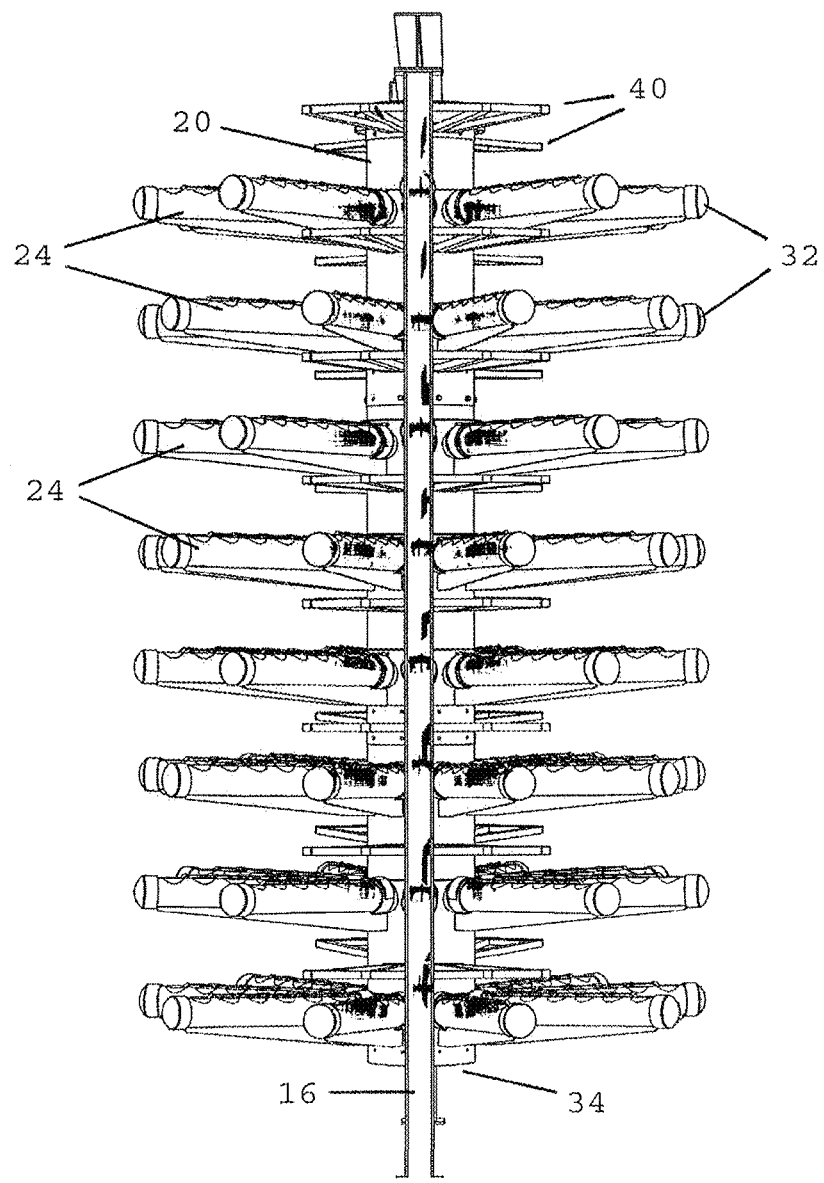
FIG. 4 is a side view of the growing unit shown in FIG. 1.
Figure 5:
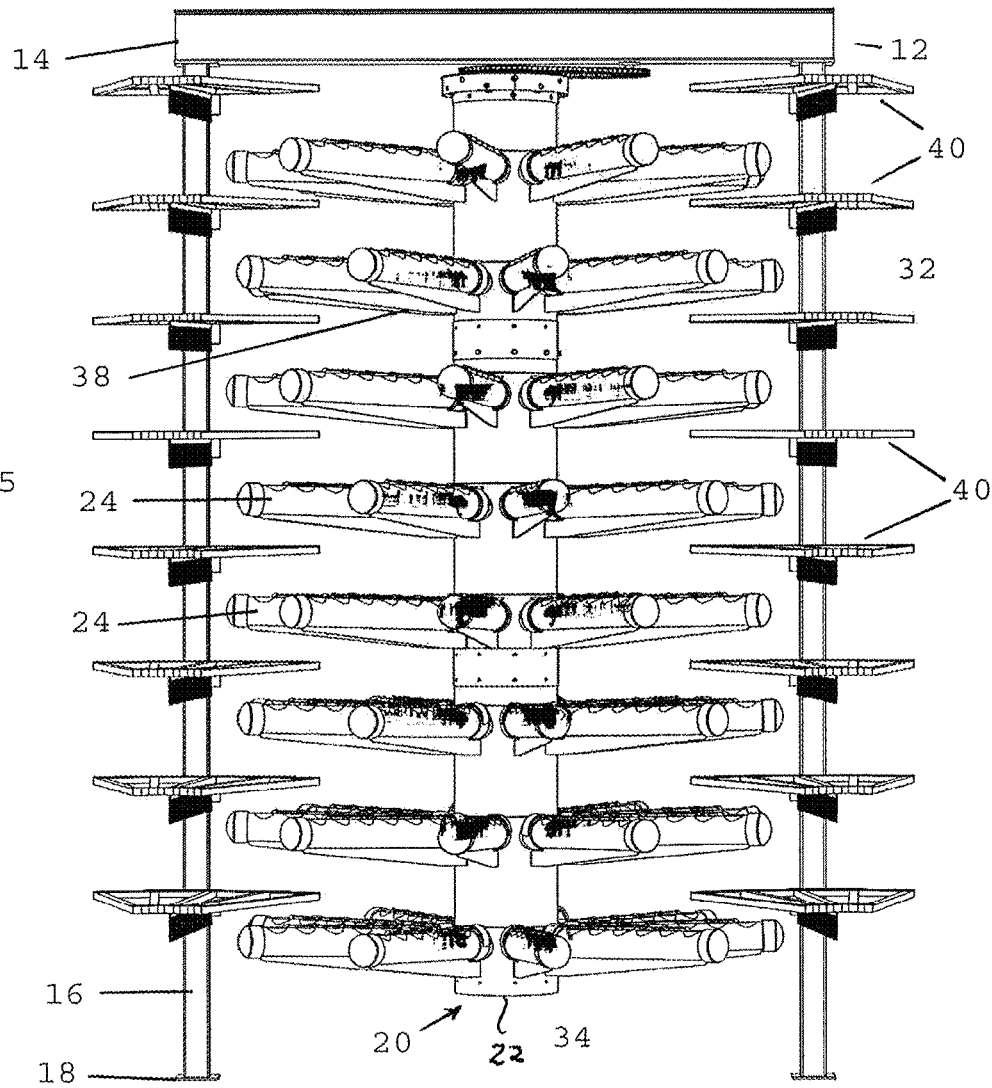
FIG. 5 is a front view of the growing unit shown in FIG. 1 with lighting fixtures swung out of operating position.

Rotating planter assembly 20 (FIG. 3) is suspended from beam 14. It includes a central drainage tube 22 from which a plurality of potting arms 24 are attached and extend radially. As shown in FIG. 3, central drainage tube 22 may comprise three tubing sections 26, 28, 30 secured together. Such sections may be PVC. In the embodiment shown there are 8 horizontal levels of potting arms 24 with 9 potting arms per level.

Potting arms 24 are each preferably PVC pipes, 6 inches in diameter and 2 feet or 4 feet long, closed at end 32 and attached to central drainage pipe 22 at the opposite end so that liquid flows from the interior of potting arms 24 into central drainage pipe 22 and out the bottom 34 of central drainage pipe 22 through a drainage outlet (not shown). Each potting arm 24 is provided with a plurality of pot receptacles 36, six per potting arm as shown, which are each sized to receive a seedling plant in a soil cylinder. Each pot receptacle is perforated to permit the flow of fluids from recess 36 into the interior of potting arm 24. Potting arms 24 are supported on brackets 38 and connect to central drainage pipe 22 by a fluid sealed pipe fitting.

Figure 2:
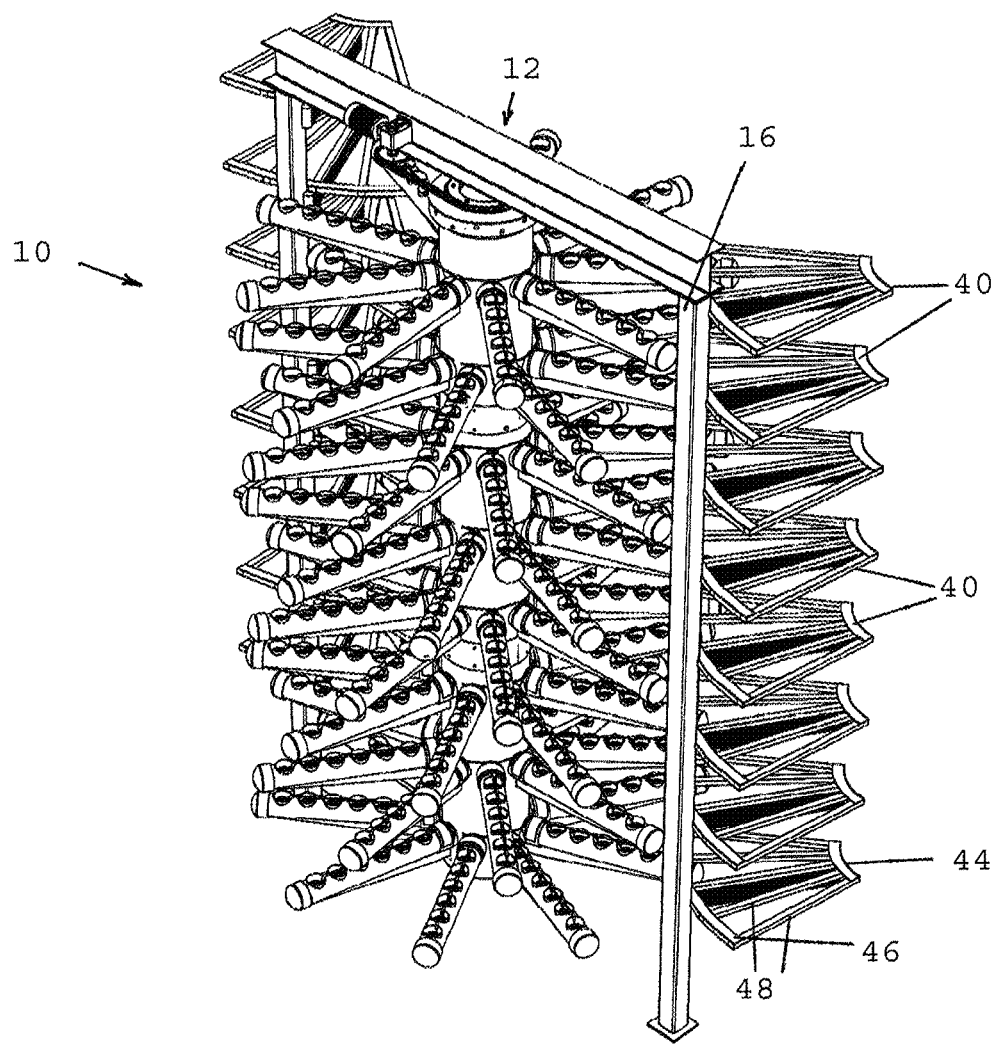
FIG. 2 is a perspective view of the growing unit shown in FIG. 1 with lighting fixtures swung out of operating position.

Horizontal light fixtures 40, shown in FIG. 2, are hingedly connected to vertical posts 16 at hinge 42 to permit them to swing into operational position shown in FIG. 1 and out of operational position as shown in FIG. 2. Fixtures 40 each have a frame formed of inner arc 44, outer arc 46 and radial frame members 48. Each fixture may carry ballasts and electrical connections for 10 T5 HO fluorescent bulbs, with electricity provided through connections 42 from vertical posts 16, controlled by a remotely controlled electrical switch. While fluorescent lamps are preferred, other growth promoting lights can be used, such as light emitting diodes (LEDs), high pressure sodium lamps, metal halide lamps or incandescent light bulbs. The electrical control switches may be programmed to provide a coordinated light cycle (photoperiod) for the plants at each growth stage and depending on the particular plant.

Figure 6:
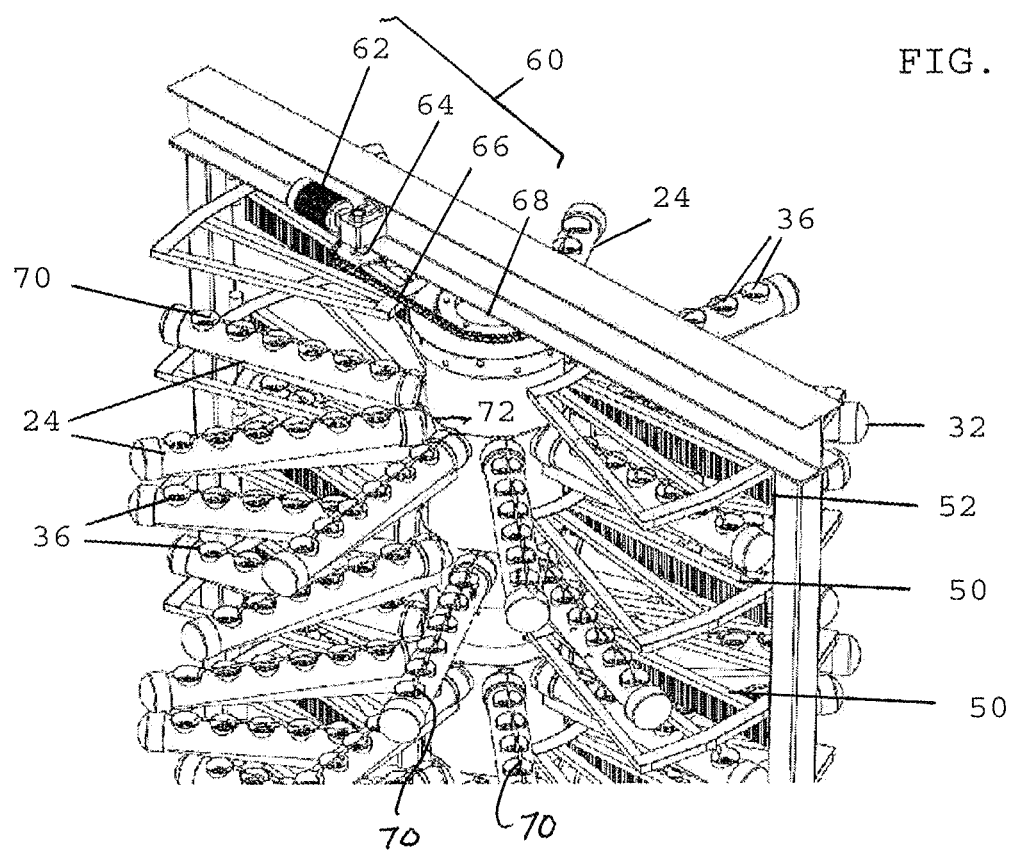
FIG. 6 is a detail of the perspective view shown in FIG. 1.

Attached to the central radial frame member 48 of each fixture 40 is a mechanical pollinator arm 50, formed of a suspended strip of micro-fibre strands 52 (see FIG. 6). Fixtures 40 can be individually raised or lowered on posts 16 by electrically powered activators, and activators may also provide power to swing each fixture 40 into and out of operating position as described above. Preferably the mechanical pollinator is kept at a height whereby the bottom 2 inches of the strands 52 brush over plants carried by the potting arms 24. Since the length of the strands 52 will typically be 4 or 5 inches, and the plants may reach a height of as much as 10 inches, there should be a clearance of about 14 inches between the fixture 40 and potting arms 24. As the plants grow, the fixtures 40 are elevated higher on post 16. An ultrasonic vibrator on or connected to each fixture 42 can also be provided to enhance the pollination activity of the mechanical pollinators 50. Also provided on the frame members 48 of each fixture 40 is an air emitting nozzle arm (not shown) which emits $CO^2$-enriched air onto the potting arms 24. Preferably compressed air is provided through an air line extending up vertical post 16 and through hinge element 42 and emits $CO^2$-enriched air onto the plants in potting arms 24.

With reference to FIG. 6, water and food is provided to plants in pot receptacles 36 by drip emitters 70 connected to and supplied by feed line 72. Drip emitters 70 are of the usual type used in greenhouses, hydroponics and other horticultural applications to provide a slow drip feed. Liquid feed lines 72 thus supply liquid nutrient solution to the pot receptacles 36 on each level through drip emitters 70. Liquid nutrient is delivered to the liquid feed lines 72 from feed tanks (not shown).

With reference to FIG. 6, drive system 60 has an electric motor 62, driving sprocket 64 which drives chain 66 which in turn drives sprocket 68 attached to central drainage pipe 22. Drive system 60 thus when activated rotates central drainage pipe 22 and attached potting arms 24 at a slow rate of rotation. Depending on the stage of growth and types of plants a typical rate of rotation is 4 rotations per hour. Rotation can be in either direction.

As an alternate embodiment (not shown), central discharge pipe 22 can be replaced with a circular array of chains, hanging downwardly from a circular drive plate attached to sprocket 68. Potting arms 24 are clipped onto brackets bolted onto the chains, one per chain. For example 16 arms can be attached per level, with 13 levels of arms and 4 pots per arm. Drainage may be carried through pipes on each chain as well as air lines and feed lines.

In operation seeded germination pucks are prepared in a separate location and each plant goes through a first germination stage prior to being placed in growing unit 10. After a sufficient germination period, and once the plants are ready to be transferred to the growing unit 10, a wheeled scissor lift is used to load the plants into the pot receptacles 36 on each level of potting arms 24. This is done manually on each scissor lift. One end of a conveyor is connected to the scissor lift and the plants are loaded on the other end of the conveyor. Scissor lifts are motorized to permit the scissor lifts to service a number of growing units 10. The plants remain on each growing unit 10 until they are ready to harvest. Once the plants are sufficiently mature, they are manually removed from each level onto a scissor lift and loaded onto a conveyor. Preferably new seedlings replace each harvested plant at the same time the plants are harvested. The plants can also be packaged at the time of harvesting on the scissor lift before being placed in the conveyor, and then stored in cold storage.

The growing facility may house a large number of growing units 10 and may also include the germination area, a packaging area, cold storage, cleaning area, seeding area and a feed tank storage area. In the example shown, each growing unit 10 handles 432 plants on a floor space of about 144 square feet for 4 foot potting arms 24.

Example—Strawberries

An example of application of the invention to the production of strawberries is described as follows. The preferred liquid nutrient solution mixes are:
  i) a Bacterial Compost Tea mixed by, for each 20 L of filtered water adding
  1.5 pounds (700 g) bacterial compost or vermicompost
  3-4 tablespoons (45-60 ml) liquid black strap molasses
  4 teaspoons (23 g) dry soluble kelp or 2 tablespoons of liquid kelp
  3-4 teaspoons (15-20 ml) fish emulsion ii) as a fertilizer/nutrient solution, PURA VIDA™ GROW produced by Technaflora Plant Products of Mission BC, Canada. EDTA Iron is added at 20 ppm to the final solution. 1 gallon of compost tea is added for each 50 gallons of the feed solution with each new batch mixture.

In the germination stage, strawberry seeds are planted into Jiffy™ peat pucks (preferably Item #70000591), which are seed starting plugs. After about a week the plants are sprayed with the full strength compost tea solution at 5.8 pH. For the second week the media is soaked once per day with a 400 ppm fertilizer solution at 5.8 pH. After about 15 days the seedlings are transplanted into molded plastic pots 85 filled with 75% Botanicare™ Cocogro® Coir Fiber media to 25% perlite. Botanicare ZHO™ Root Inoculant is added according to the label directions and also added is 1 tbsp dolomite lime per gallon of media saturated in the same compost tea mix used in the seeding process. The pots are then placed in pot receptacles 36 on each level of growing unit 10. The temperature is maintained at 62 degrees F., the humidity is maintained at 68% and the light cycle is kept at 18 hours On, 6 hours Off. Rotation of the unit is 4 revolutions per hour. At days 15-30, the drip emitters are activated once a day with the fertilizer solution at 540 ppm at 5.8 pH. After about 30 days, the media is saturated at 1 EC (electrical conductivity) and plants are sprayed with the full strength compost tea solution brewed as above at 5.8 pH. From Days 30-45, the emitters are activated twice a day with the nutrient solution at 640 ppm at 5.8 pH. At day 45 the plants are harvested.

Thus using the invention, a continuous automated and controlled production of plants can be obtained. Different lighting, temperatures, humidity and nutrition can be programmed for the different growth stages of a crop and also for different crops. This can be done remotely by computer. The land space required to produce a crop is dramatically reduced and can be further reduced by increasing the height of the growing units 10. The entire process can be automated using robots to transfer the plants at different stages.

While the present apparatus and method are well-suited for strawberry production, many other types of plants can also be effectively produced using the present apparatus and method, such as lettuce, spinach, herbs, grape seedlings and tomato seedlings.

Figure 7:
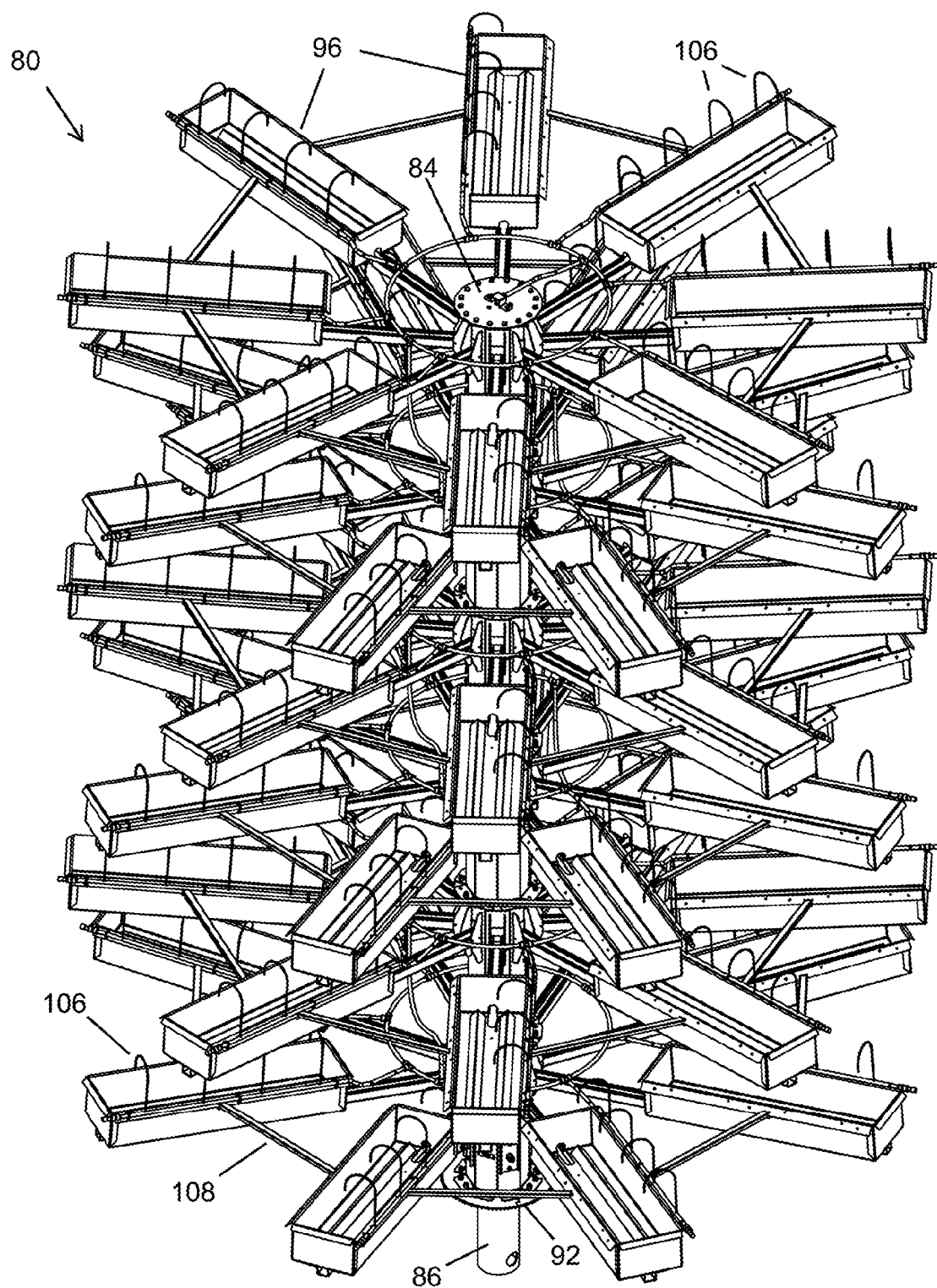
FIG. 7 is a perspective view of a vertical growing tower which relies on natural light or a separate light source.
Figure 8:
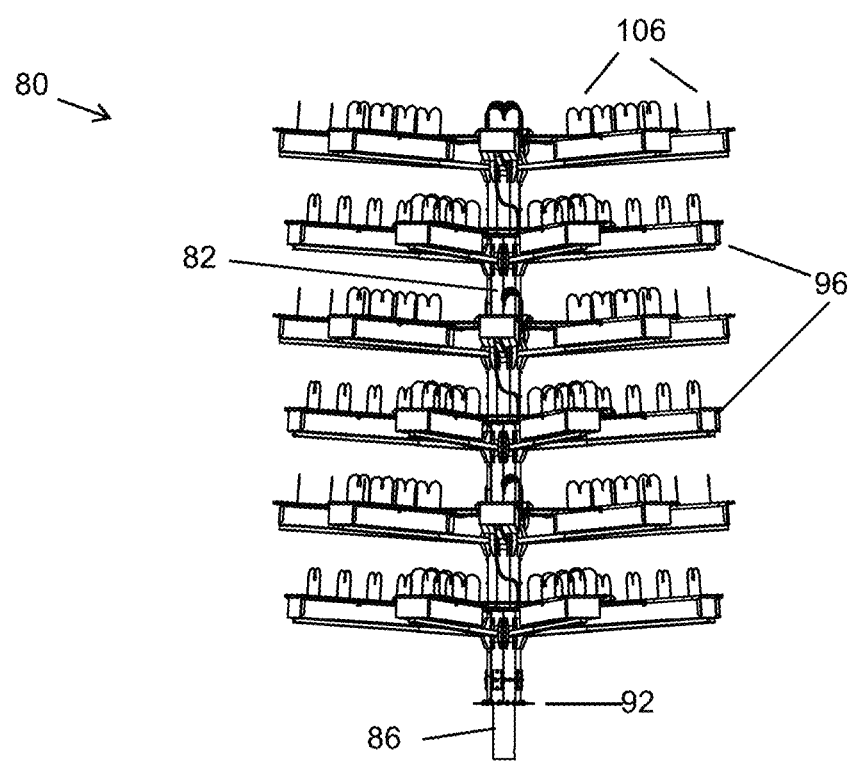
FIG. 8 is a front view of the embodiment shown in FIG. 7.
Figure 9:
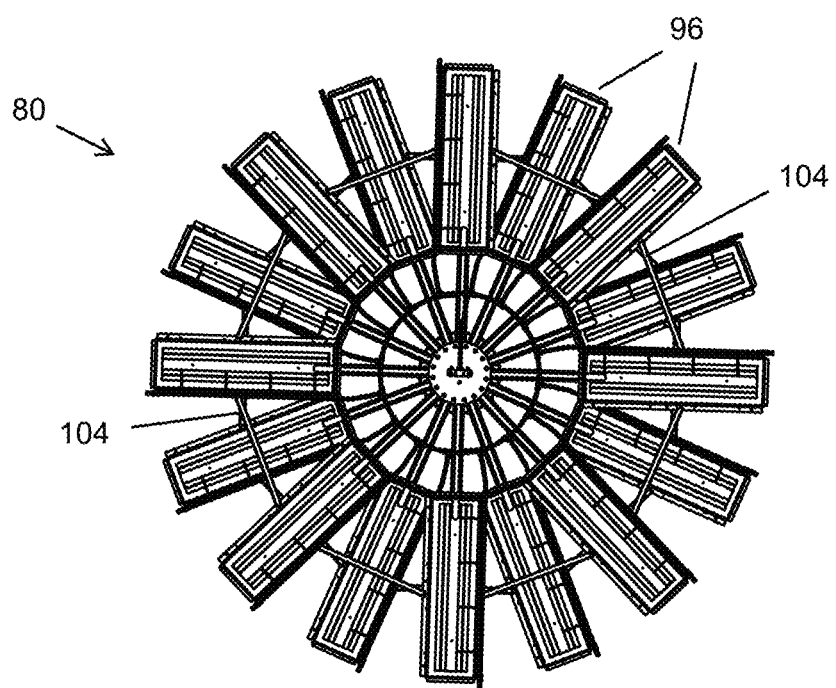
FIG. 9 is a top view of the embodiment shown in FIG. 7.
Figure 23:
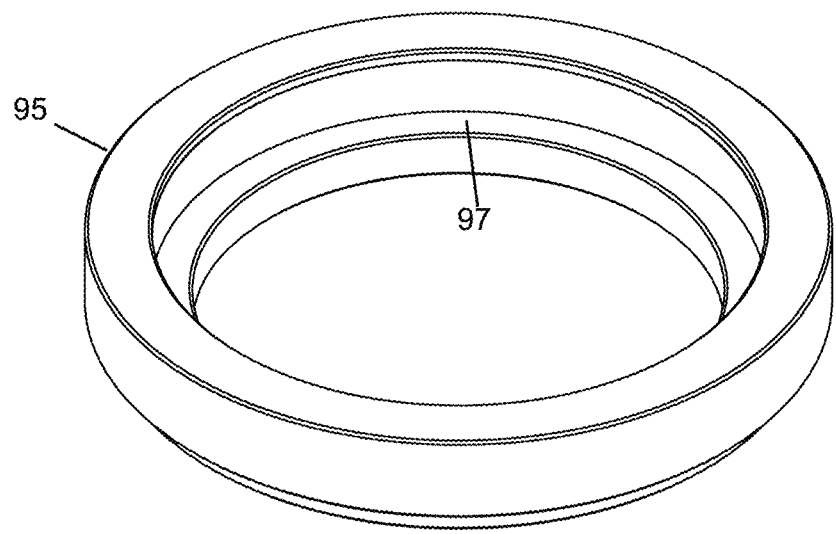
FIG. 23 is a perspective view of the lower bearing cap.
Figure 24:
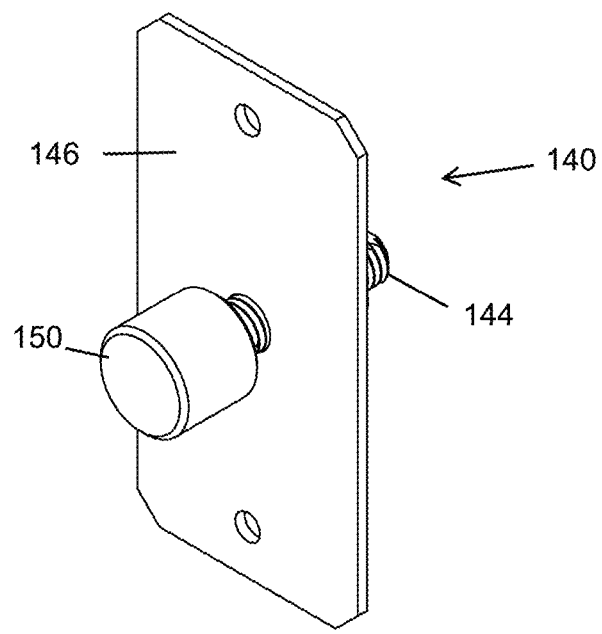
FIG. 24 is a perspective view of the stabilizer plunger assembly.
Figure 25:
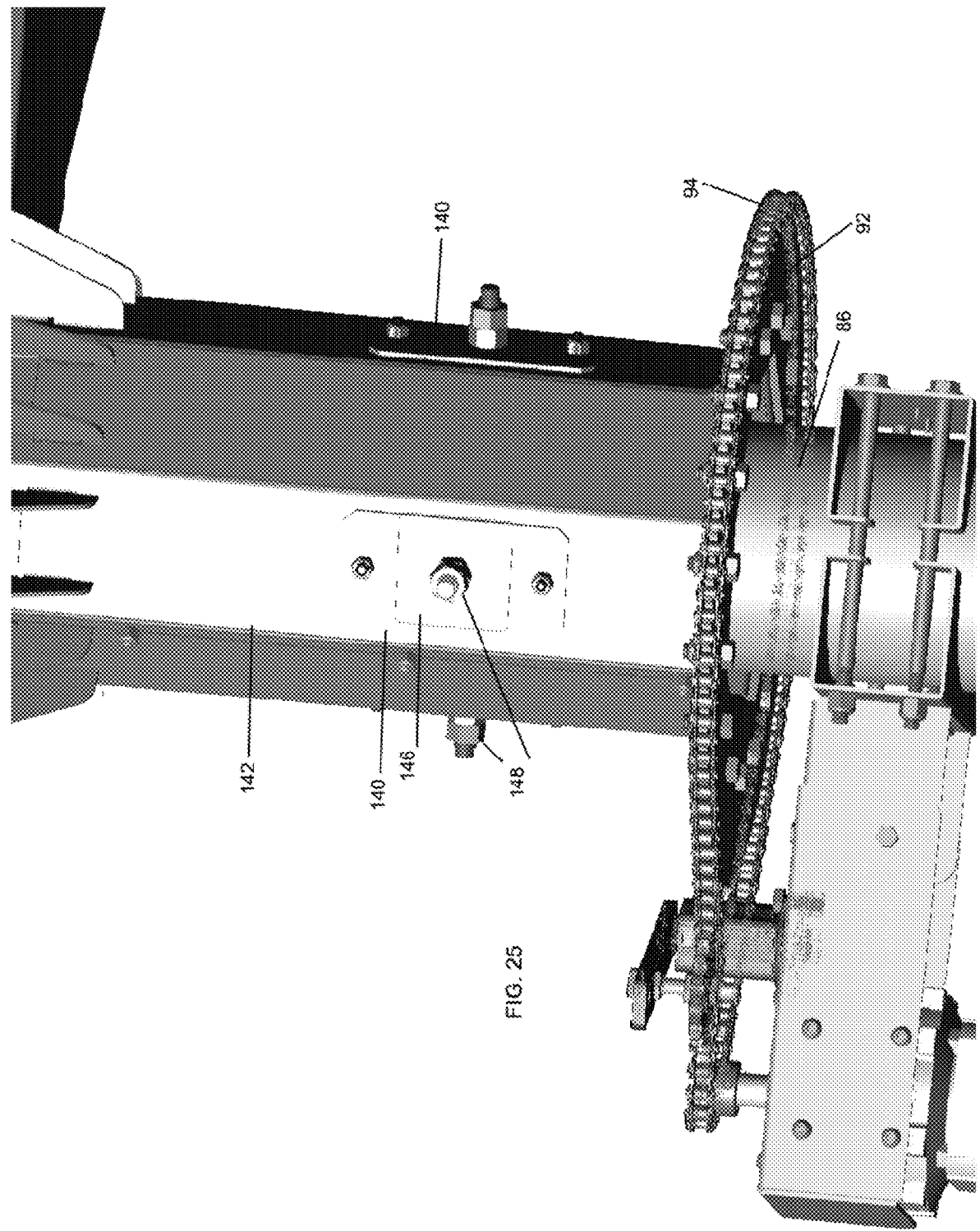
FIG. 25 is a detail perspective view partially cut away to show the stabilizer plunger assembly.

A further embodiment is illustrated in FIG. 7, where the vertical growing tower for automated cultivation and harvesting of plants is designated generally as 80. In this embodiment, rather than using a frame for support the growing tower is supported by hollow segmented central column 82. Column 82 in turn rests on, is supported by and rotates on a hollow fixed central cylindrical pipe 86, which may be a 6-inch diameter steel pipe. Column 82 rotates on a bearing assembly at the top of central pipe 86. As described in further detail below with reference to FIG. 19-22, central column 82 is supported from its top plate 84 which is secured, for example by a number of bolts 83 to the upper edge of the top column segment 81. Top plate 84 is also secured, for example by bolts 87, to top mounting boss 85, which in turn in turn rests by friction on the upper surface of the inner race 89 of bearing 91. The outer race 93 of bearing 91 is supported on shoulder 97 of a lower bearing cap 95 (FIG. 23) which in turn is mounted on the upper end of fixed pipe 86. Thereby top plate 84 and the attached column 82 rotates on fixed pipe 86.

A second embodiment of the bearing assembly is illustrated in FIG. 28. Top plate 84 is again secured to top mounting boss 85, which in turn in turn rests by friction on the upper race of one-piece thrust ball bearing 160, which may be aq roller thrust bearing for high axial loads at low speed. Thrust bearing 160 sits in bearing housing 162 which is secured to pipe flange 164. Pipe flange in turn sits on the top of the upper end of fixed pipe 86. Thereby top plate 84 and the attached column 82 rotates on fixed pipe 86.

The lower end of fixed pipe 86 may in turn may be mounted into or onto a support post (not shown). For example the support post may be a solid cylindrical post set in the ground or in concrete. The lower end of fixed cylinder 86 may also be supported in or on a base, preferably concrete or steel which may be either buried in the ground or free standing on top of the ground.

Figure 16:
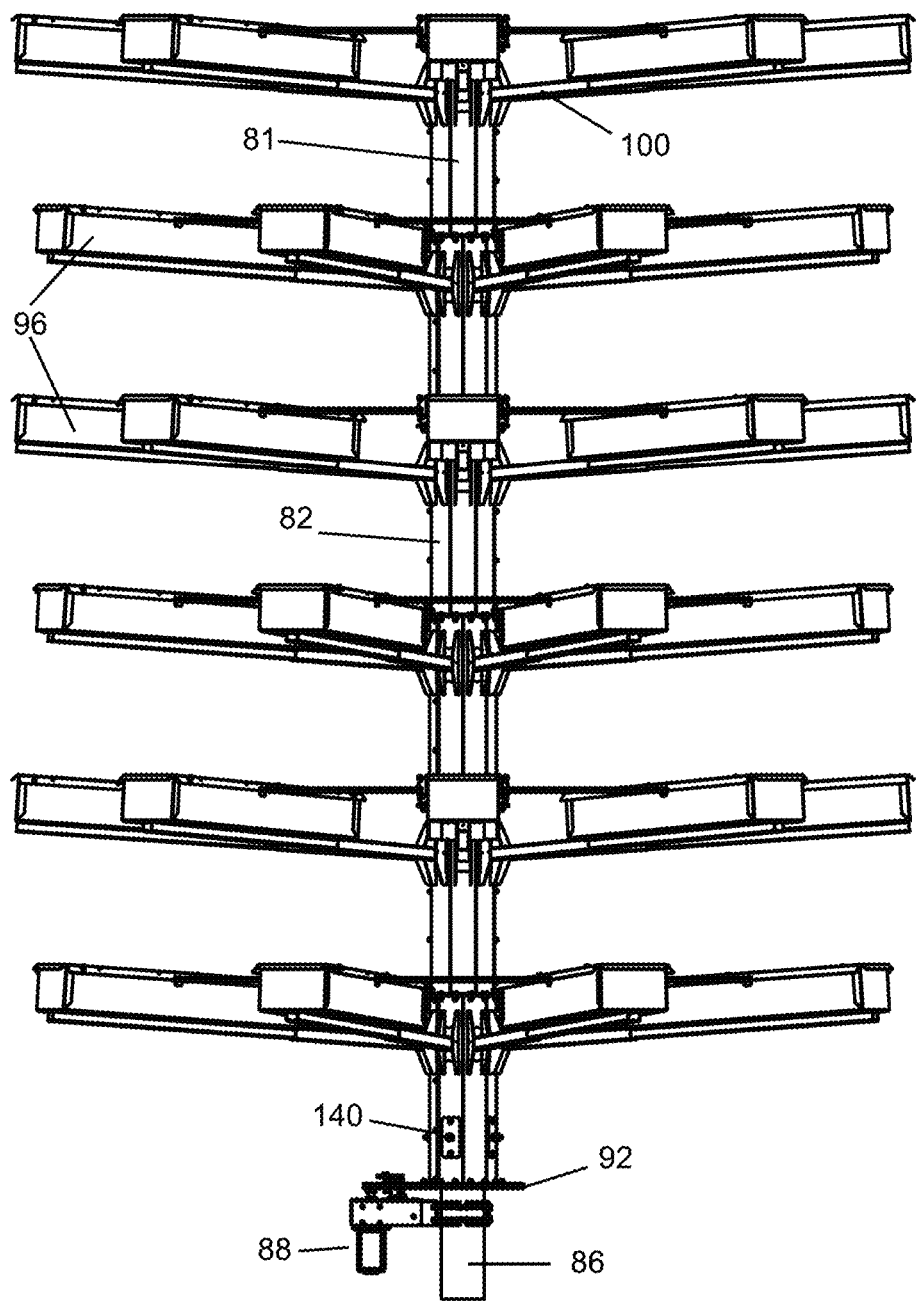
FIG. 16 is a front view of the embodiment shown in FIG. 13 illustrating the drive motor.

Column 82 is rotated on center pipe 86 by electric motor 88 through motor sprocket 90 driving tower sprocket 92 through roller chain 94 (FIG. 16). As described in the first embodiment above, the drive motor 88 when activated rotates central column 82 and the plant troughs 96 at a slow rate of rotation which will depend on the stage of growth and types of plants, such as a typical rate of rotation of 4 rotations per hour. Rotation can be in either direction. To maintain the central column centered on center pipe 86, four adjustable stabilizer rods 140 may be provided on the lowest column segment 142. The stabilizer rods each have a threaded bolt 144 adjustable through plate 146 by nuts 148 whereby cylindrical rubber bumper 150 may be adjusted radially to contact the outer surface of central pipe 86.

Figure 26:
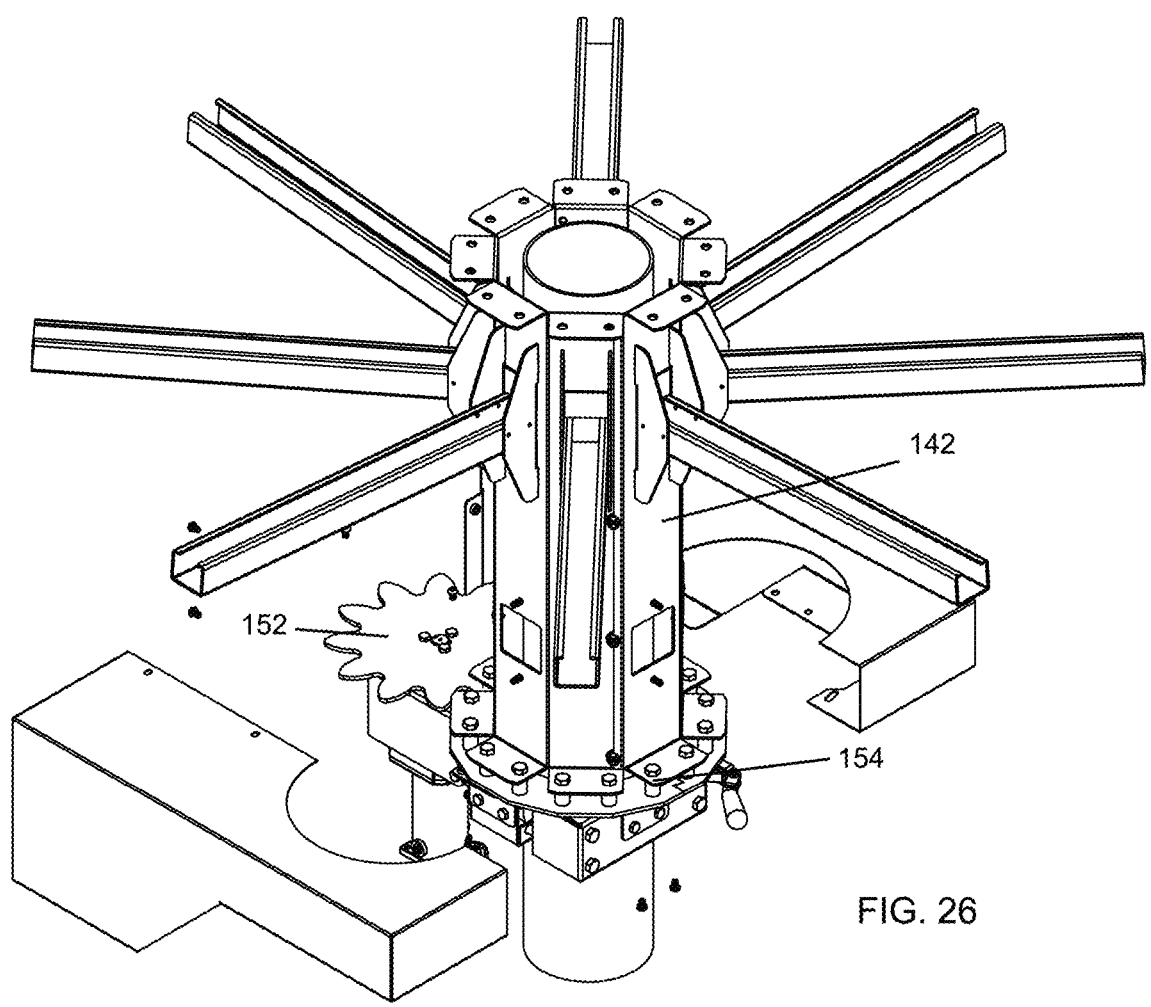
FIG. 26 is an exploded perspective view of a second embodiment of the drive system.
Figure 27:
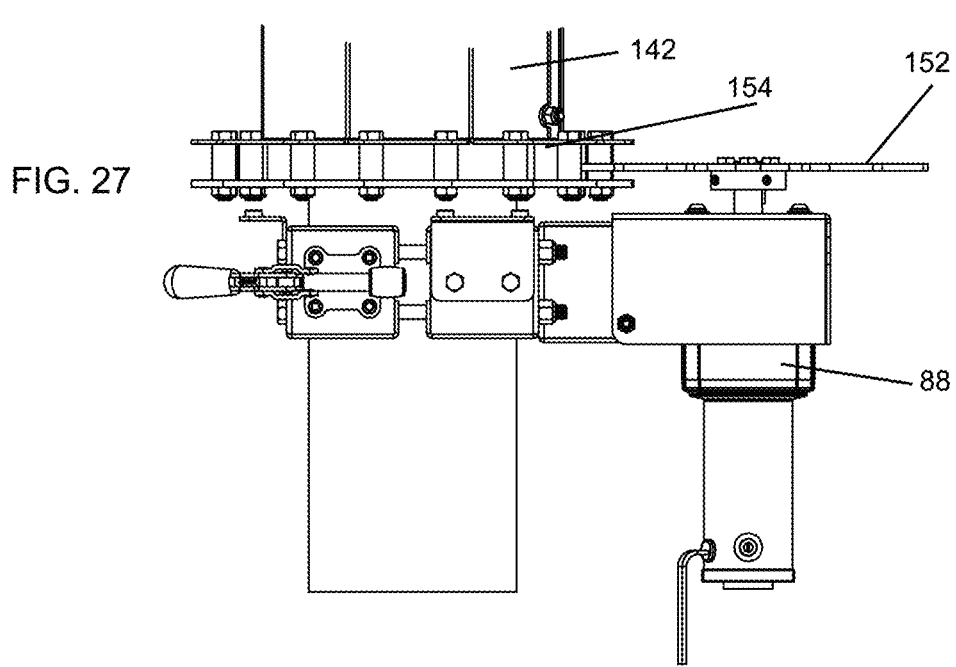
FIG. 27 is an elevation view of the second embodiment of the drive system shown in FIG. 26.

A second embodiment of the drive system is a direct drive system illustrated in FIGS. 26 and 27. Electric motor 88 drives lantern gear 152 which engages and drives lantern cage assembly 154 secured to the lower column segment 142.

Figure 17A:
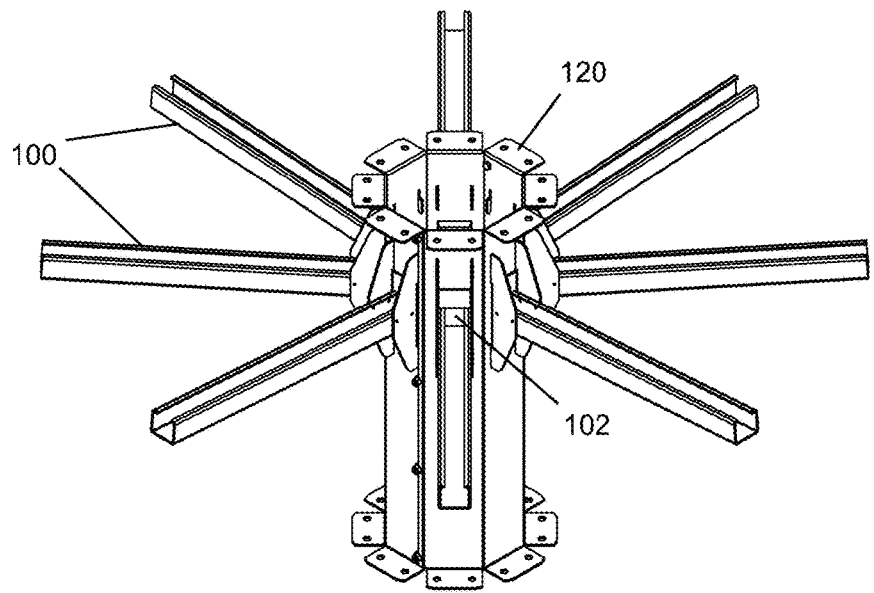
FIG. 17A is a detail view of a column segment sub-assembly for the embodiment shown in FIG. 13, FIG. 17B being an exploded view thereof.
Figure 17B:
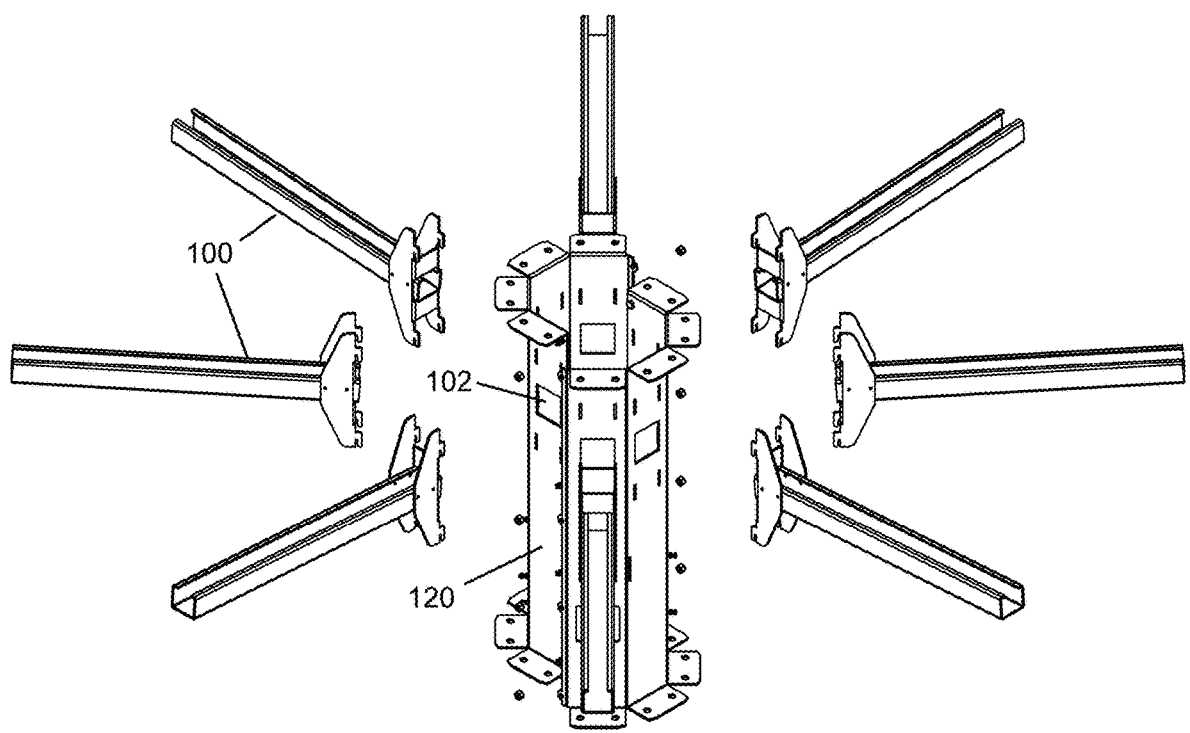

With reference to FIGS. 7, 8, 17 and 18, growing plants are supported in a plurality of plant troughs 96 in a plurality of horizontal levels or tiers. In the example shown in FIG. 7 there are 6 horizontal tiers with 8 plant troughs in each level at 45 degree intervals. For such an arrangement, as an example the tower diameter may be 9⅔ feet (3 m.) with a height of 13¼ feet (4 m.). Each tier of column 82 is formed of a column segment 120 (FIG. 17). Troughs 96 are each supported on a trough drain and bracket 98 which connect to radial collection tubes 100 which connect to apertures 102 in the central column 82. Tangential connecting braces 104 connect adjacent troughs 96 in each tier to provide rigidity.

Figure 10:
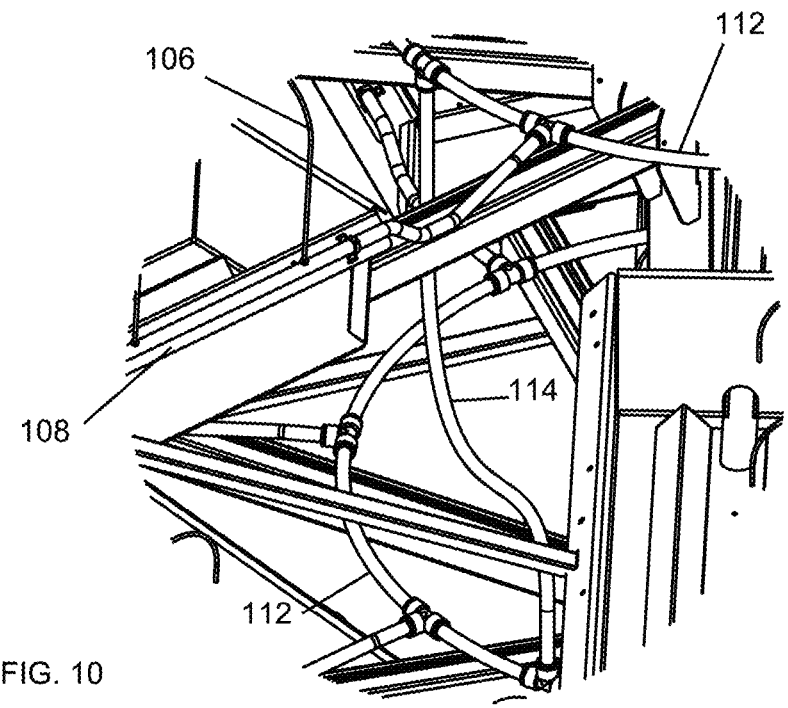
FIGS. 10, 11 and 12 are details of the water supply features shown in FIG. 7.
Figure 11:
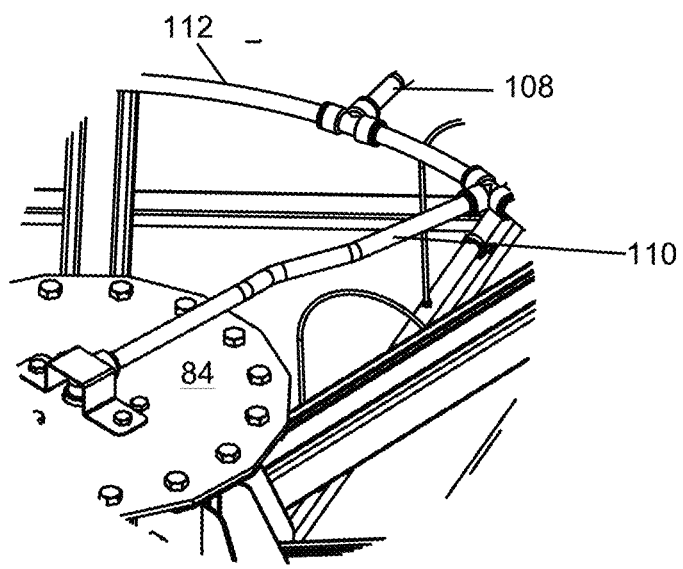
Figure 12:
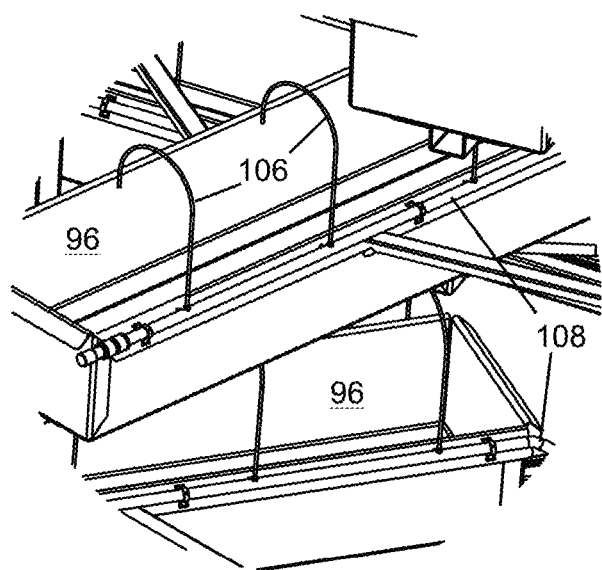
Figure 13:
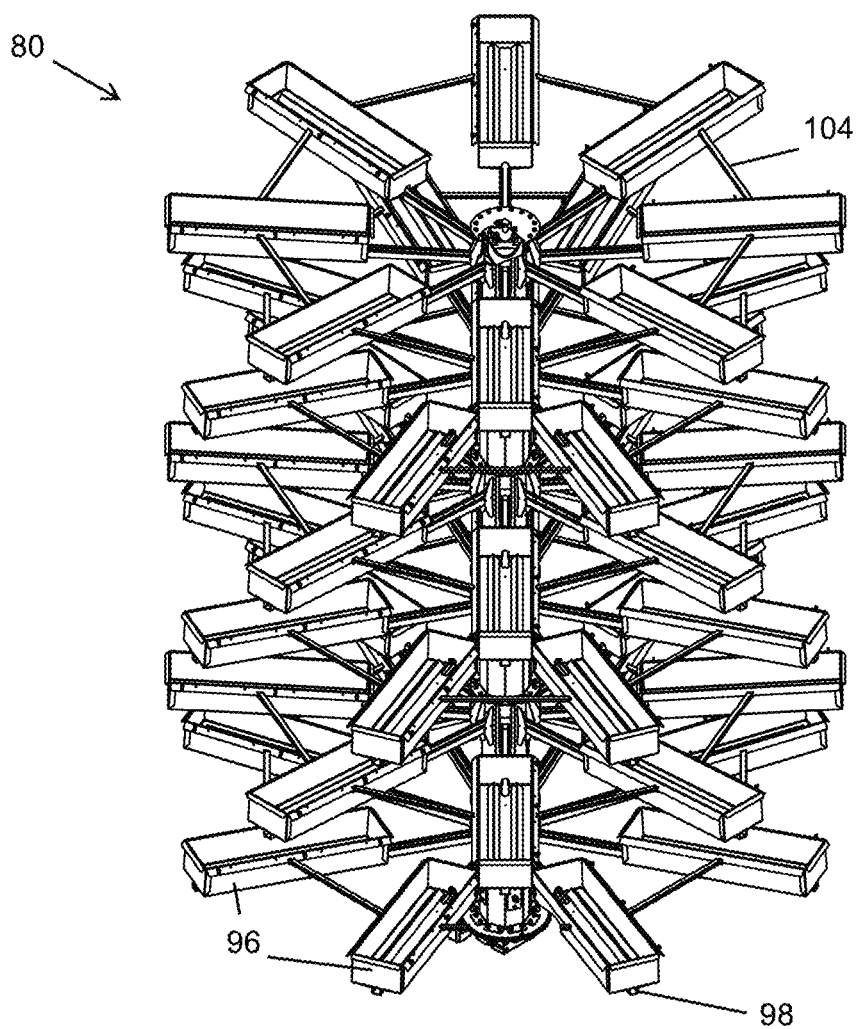
FIG. 13 is a perspective view of the vertical growing tower shown in FIG. 7 with the water delivery system removed for ease of illustration.
Figure 14:
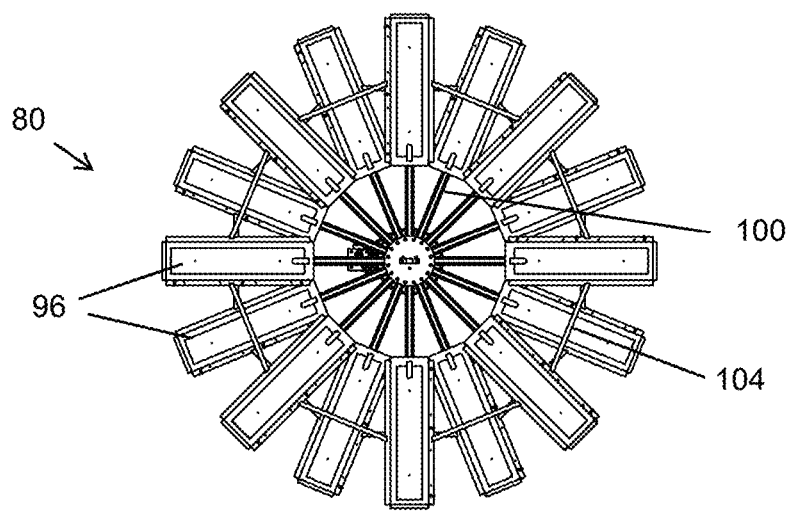
FIG. 14 is a top view of the embodiment shown in FIG. 13.
Figure 15:
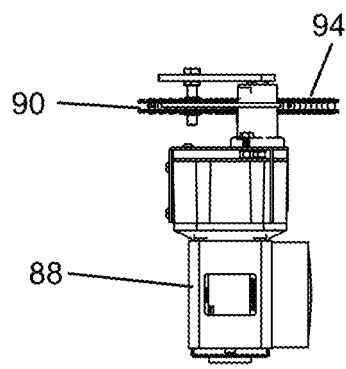
FIG. 15 is a detail of the drive motor shown in FIGS. 7 and 13.

Water and food is provided to plants in plant troughs 96 by drip emitters 106 connected to and supplied by feed line 108. Drip emitters 106 are similar to those described above and of the usual type used in greenhouses, hydroponics and other horticultural applications to provide a slow drip feed. Liquid feed lines 108 are fed by a central feed line 110 (FIG. 10) which extends up the hollow interior of central pipe 86 and connects to circular lines 112 on each horizontal level. Intermediate lines 114 extend between lines 112 on adjacent horizontal tiers. Lines 108 connect the drip emitters 106 to the circular lines on each tier to supply water and liquid nutrient solution to the plants in each plant trough 96. Water and liquid nutrient is supplied under pressure to the central liquid feed line 110 from feed tanks (not shown) up through the central axis of column 82.

Figure 18A:
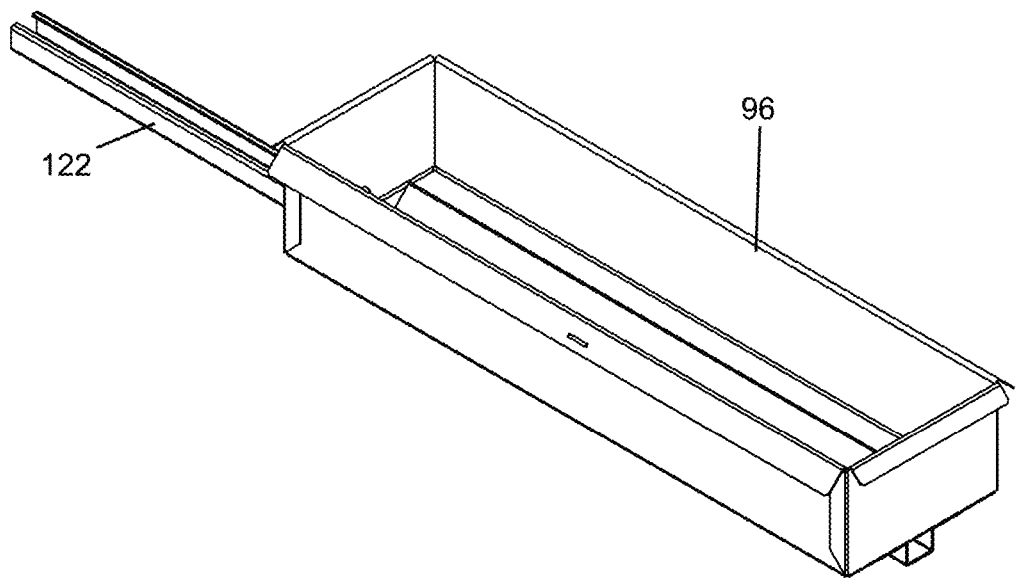
FIG. 18A is a detail view of a trough sub-assembly for the embodiment shown in FIG. 13, FIG. 18B being an exploded view thereof.
Figure 18B:
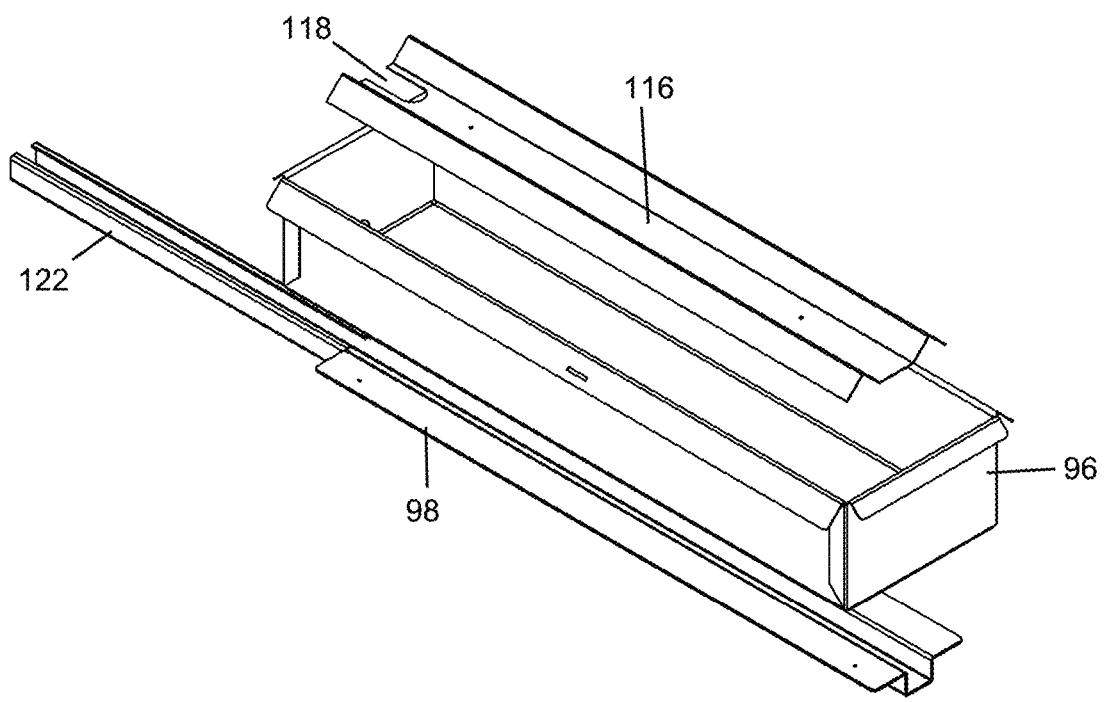
Figure 19:
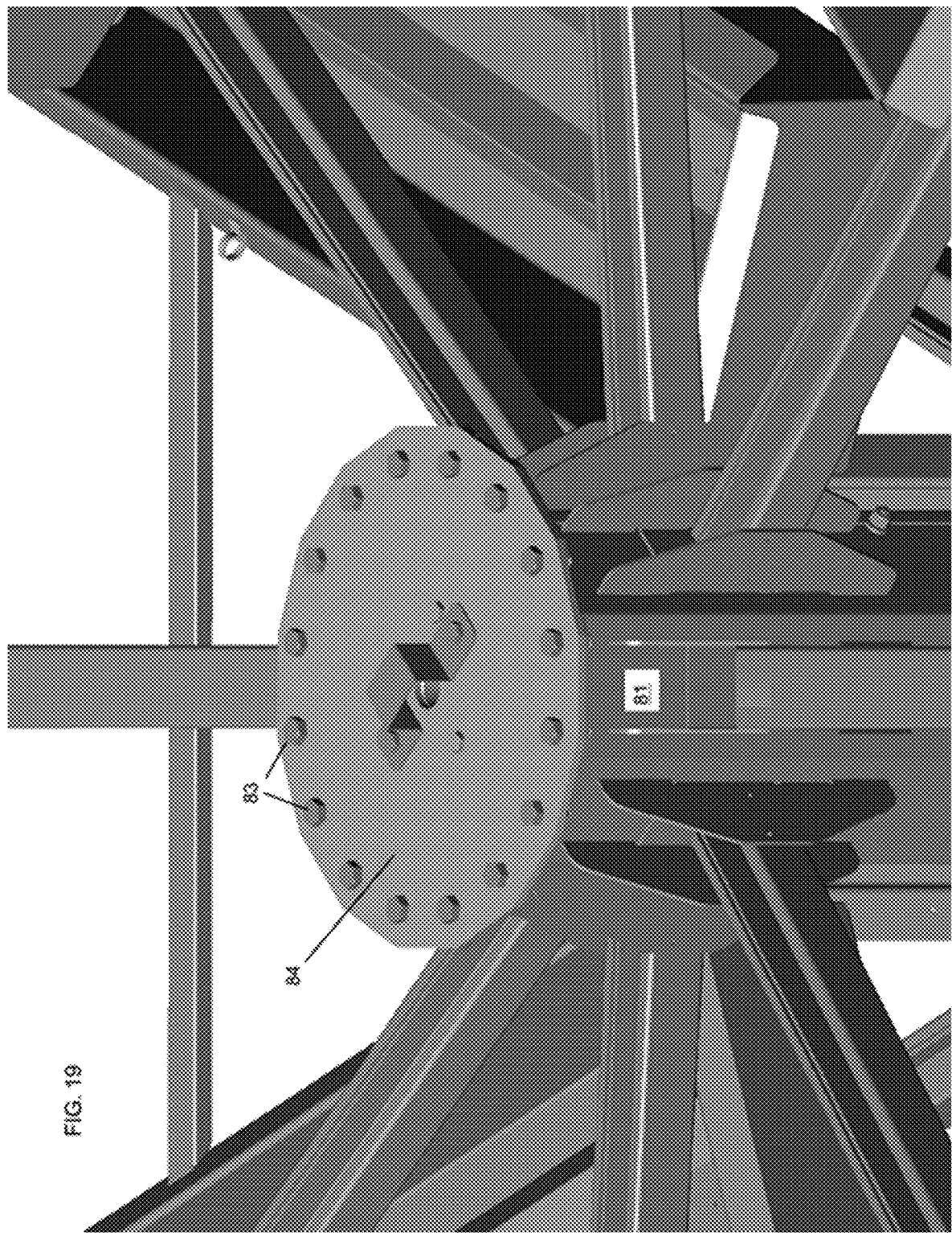
FIG. 19 is a detail perspective view of the region of the top plate of the vertical growing tower shown in FIG. 7.
Figure 20:
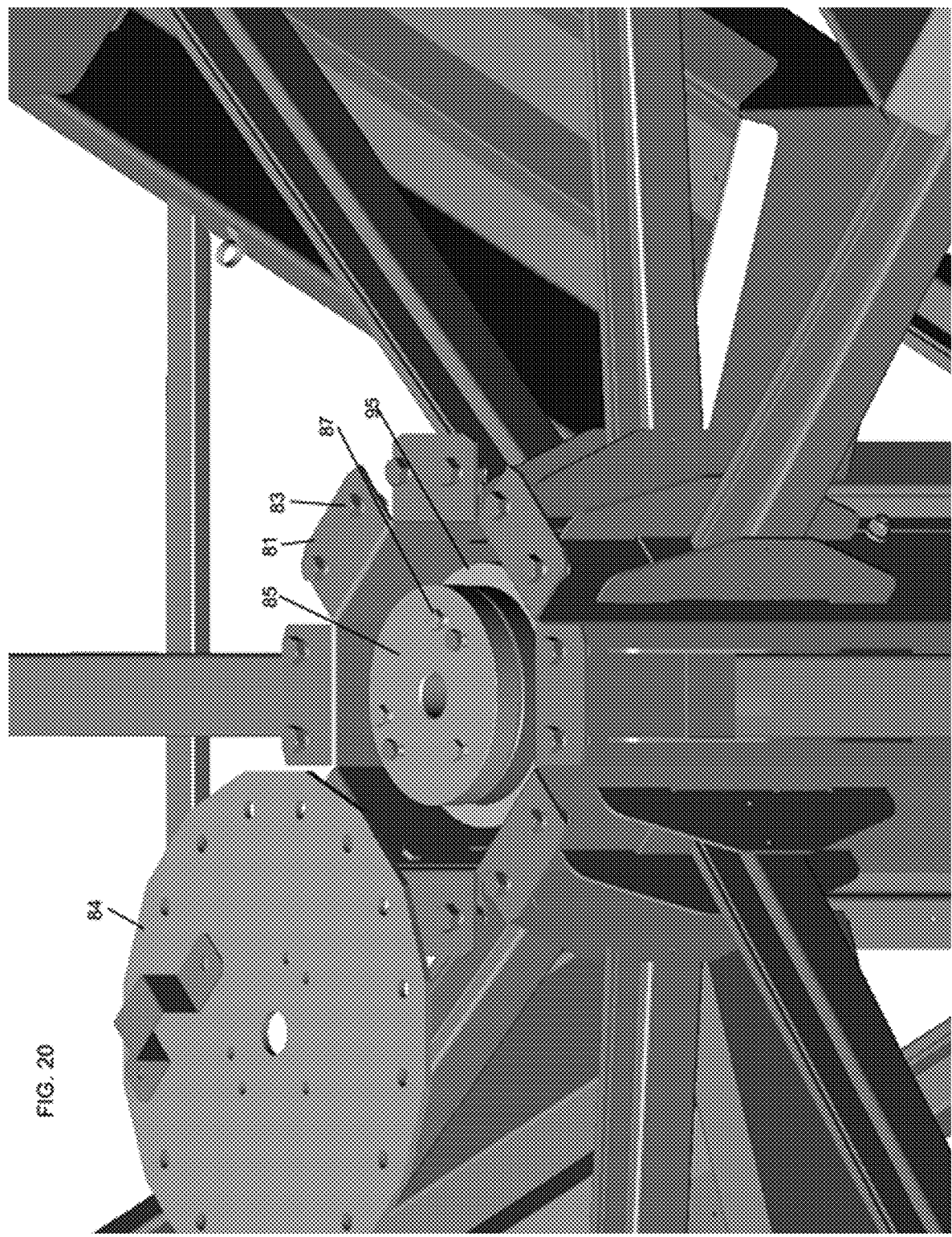
FIG. 20-22 are exploded views of the detail view in FIG. 19.
Figure 21:
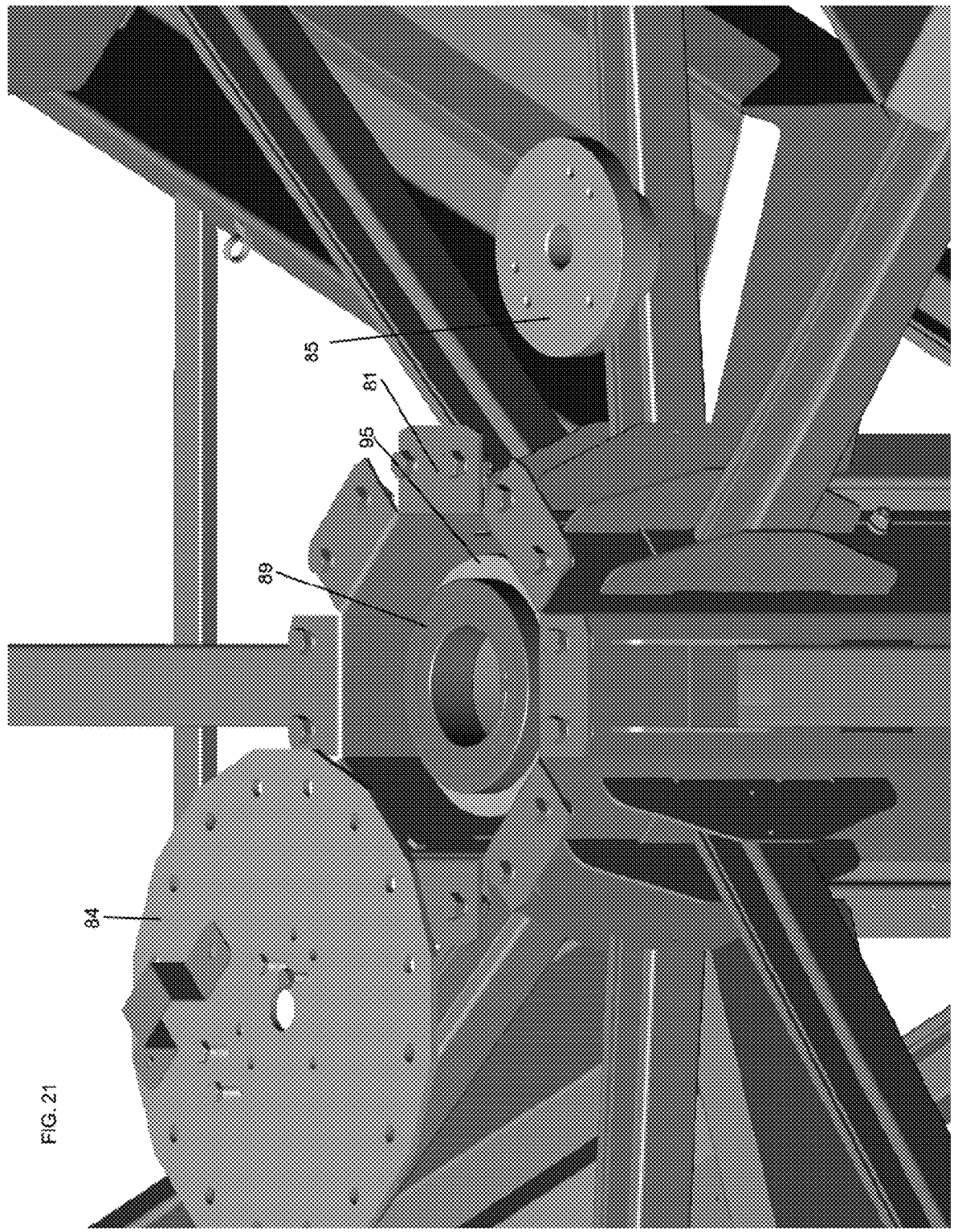
Figure 22:
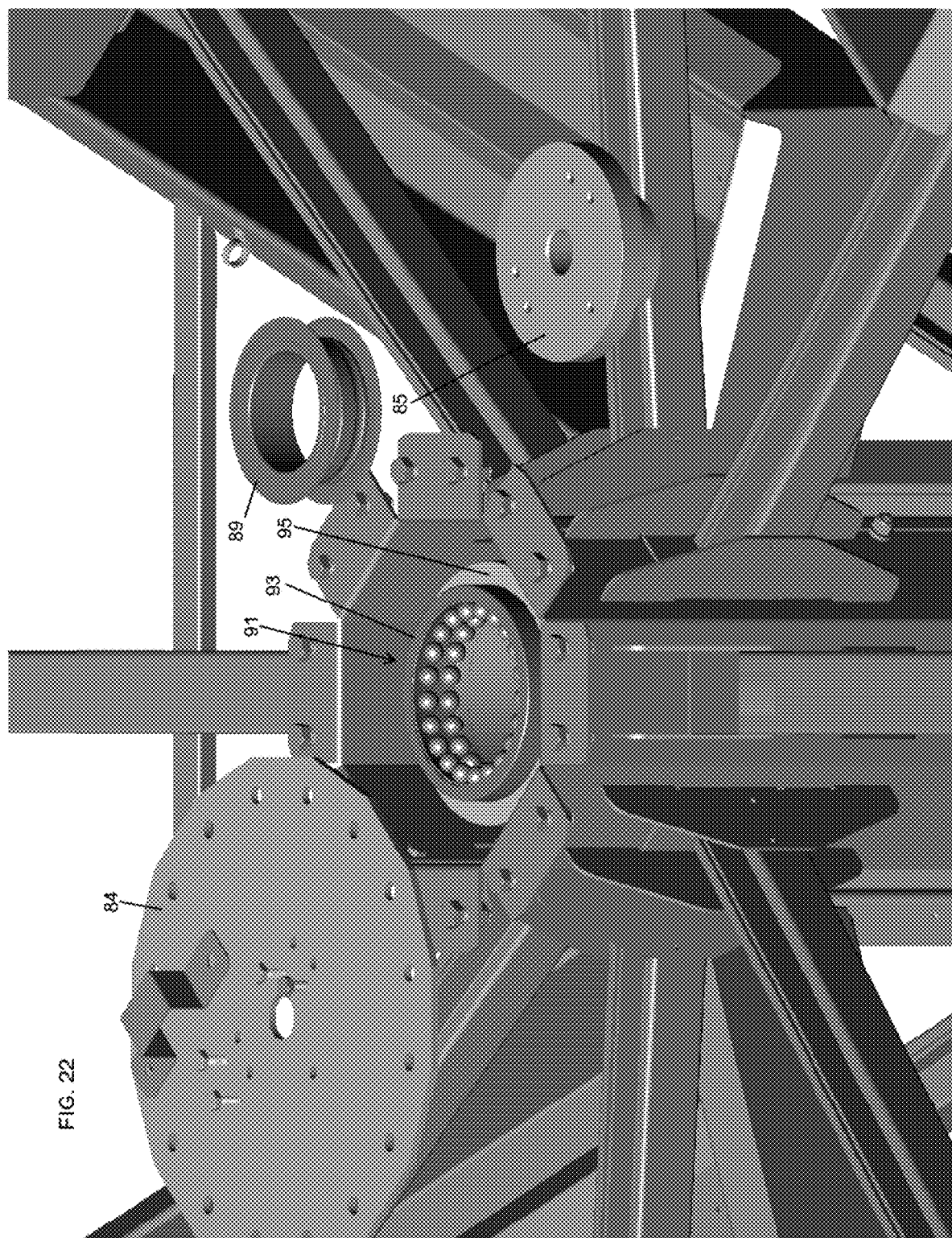

In the embodiment shown in FIG. 7, drainage from plant troughs 96 is provided down the hollow center of column 82. As shown in FIG. 18A, 18B, troughs 96 have a central bottom channel 116 which has an opening 118 through which liquid flows into trough drain 122 and then into collection tube 100 and aperture 102. The liquid then drains down the center of column 82 through a drainage outlet (not shown) and into the ground or a subsequent drainage system.

Unlike the FIG. 1 embodiment, in the FIG. 7 embodiment light fixtures are not connected to the vertical tower. Artificial lighting may be provided separately where the growing tower is operating in a greenhouse or other indoor environment, for example using fluorescent lamps or other growth promoting lights as described above, programmed to provide a coordinated light cycle) for the plants at each growth stage and depending on the particular plant. Alternatively or in addition the plants may be grown in natural sunlight.

In operation, each plant trough 96 is provided with a plurality of plant growing units, such as soil-containing, porous water-permeable cloth bags, or other plant growth medium, open on the top and which are each sized to receive a seed, seedling plant or growing plant and permit growth of the plant in the growth medium. Otherwise the system operates as described above, and the growing facility may be open to natural light and/or operate utilizing both natural and artificial light.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

What is claimed is:

1. Apparatus for continuous automated growing of plants, comprising:
    a) a vertically extending central support element having a central vertical axis;
    b) a hollow column mounted on said support element and rotatable about said central axis of said support element;
    c) a plurality of vertically spaced, generally horizontal, generally co-planar arrays of plant supporting arms extending radially from said hollow column wherein each plant supporting arm is provided with an upwardly opening trough element to receive a plant seed, seedling or growing plant in a plant growth medium;
    d) a plurality of liquid supply lines communicating with each trough element and supplied by a liquid feed line to provide water and liquid nutrient to each said trough element; and
    e) a motor for rotating said hollow column about said central axis of said support means thereby rotating said plant supporting arms about said central axis of said support means;
    wherein the interior of each said trough element communicates with the hollow column whereby liquid flows from each said trough element through related plant supporting arm which supports said each said trough element and into said hollow column.

2. The apparatus of claim 1 wherein said vertically extending support element comprises a hollow pipe.

3. The apparatus of claim 1 wherein said hollow column is provided with a sprocket and said motor rotates said hollow column by driving said sprocket through a chain.

4. The apparatus of claim 1 wherein said hollow column rotates on a bearing assembly mounted on or near the top of said central support element.

5. The apparatus of claim 4 wherein said hollow column is provided at the top end thereof with a horizontal plate which engages said bearing assembly to thereby permit rotation of said hollow column about the central vertical axis of said central support element.

6. The apparatus of claim 1 wherein the lower end of said central support element is fixed on a supporting base or post buried in or freestanding on an underlying surface.

7. The apparatus of claim 1 wherein the lower end of said hollow column is provided rotational motion relative to said central support element by a motor fixed relative to said central support element, which motor has a drive connection which engages a gear mounted on said lower end of said hollow column.

8. The apparatus of claim 1 wherein the lower end of said hollow column is provided with a plurality of adjustable radial rods, each having a radially inwardly located end to engage the radially outward surface of said central support element to adjust said lower end of said hollow column so that it is centered on said central support element.

9. The apparatus of claim 1 wherein said liquid feed line which supplies said plurality of liquid supply lines communicating with each trough element comprises a central feed line which extends up a hollow interior of said central support element and communicates with supply lines on each said vertically spaced, generally horizontal, generally co-planar array of plant supporting arms.

10. The apparatus of claim 9 wherein said plurality of liquid supply lines communicating with each trough element each comprises a drip emitter to deliver controlled amounts of water and nutrients to each said trough element.

11. The apparatus of claim 9 wherein the radially outward end of each of said plurality of trough elements is vertically higher than the radially inward end of each of said plurality of trough elements whereby liquid drains by gravity radially inwardly along each said trough element and into said hollow column.

12. The apparatus of claim 1 wherein said central support element is a cylindrical pipe.

13. The apparatus of claim 1 wherein said hollow column is constructed of a plurality of vertical segments.

* * * * *